US012083747B2

(12) United States Patent
Batchelder et al.

(10) Patent No.: US 12,083,747 B2
(45) Date of Patent: Sep. 10, 2024

(54) LAYER TRANSFUSION SEQUENCING FOR SELECTIVE DEPOSITION-BASED ADDITIVE MANUFACTURING

(71) Applicant: Evolve Additive Solutions, Inc., Minnetonka, MN (US)

(72) Inventors: J. Samuel Batchelder, Somers, NY (US); Manish Boorugu, Minneapolis, MN (US); Zeiter Farah, Minneapolis, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 370 days.

(21) Appl. No.: 17/611,751

(22) PCT Filed: May 15, 2020

(86) PCT No.: PCT/US2020/033175
§ 371 (c)(1),
(2) Date: Nov. 16, 2021

(87) PCT Pub. No.: WO2020/236610
PCT Pub. Date: Nov. 26, 2020

(65) Prior Publication Data
US 2022/0234299 A1    Jul. 28, 2022

Related U.S. Application Data

(60) Provisional application No. 62/849,213, filed on May 17, 2019.

(51) Int. Cl.
*B29C 64/141* (2017.01)
*B29C 64/176* (2017.01)
(Continued)

(52) U.S. Cl.
CPC .......... *B29C 64/393* (2017.08); *B29C 64/176* (2017.08); *B29C 64/194* (2017.08);
(Continued)

(58) Field of Classification Search
CPC ... B29C 64/141; B29C 64/386; B29C 64/393; B33Y 10/00; B33Y 50/00; B33Y 50/02;
(Continued)

(56) References Cited

U.S. PATENT DOCUMENTS 8,123,999 B2   2/2012   Priedeman et al.
8,246,888 B2   8/2012   Hopkins et al.
(Continued)

FOREIGN PATENT DOCUMENTS

CN   109070448   12/2018
CN   109070459   12/2018
(Continued)

OTHER PUBLICATIONS

"International Preliminary Report on Patentability," for PCT Application No. PCT/US2020/033175 mailed Dec. 2, 2021 (7 pages).
(Continued)

*Primary Examiner* — Leo B Tentoni
(74) *Attorney, Agent, or Firm* — Pauly, DeVries Smith & Deffner LLC

(57) ABSTRACT

A method for making a three-dimensional (3D) part with an electrostatographic based additive manufacturing system includes establishing first and second control parameter profiles, establishing a transfusion sequence, and transfusing n+m layers on a bonding region of previously accumulated layers of the 3D part according to the transfusion sequence. The first and second control parameter profiles each include a different combination of temperature and pressure parameters usable to transfuse a single layer of the 3D part. The transfusion sequence specifies the use of each of the first and
(Continued)

second control parameter profiles in a specified order. A total thickness of the n+m layers is less than a thermal diffusion depth. The transfusion step includes transfusing n layers according to the first control parameter profile, and, after transfusing then layers, transfusing m layers according to the second control parameter profile.

20 Claims, 10 Drawing Sheets

(51) Int. Cl.
| | |
|---|---|
| *B29C 64/194* | (2017.01) |
| *B29C 64/245* | (2017.01) |
| *B29C 64/295* | (2017.01) |
| *B29C 64/364* | (2017.01) |
| *B29C 64/393* | (2017.01) |
| *G03B 13/16* | (2021.01) |
| *B33Y 10/00* | (2015.01) |
| *B33Y 30/00* | (2015.01) |
| *B33Y 40/00* | (2020.01) |
| *B33Y 50/02* | (2015.01) |

(52) U.S. Cl.
CPC .......... *B29C 64/245* (2017.08); *B29C 64/295* (2017.08); *B29C 64/364* (2017.08); *B33Y 10/00* (2014.12); *B33Y 30/00* (2014.12); *B33Y 40/00* (2014.12); *B33Y 50/02* (2014.12)

(58) Field of Classification Search
CPC ... G03B 13/16; G03B 15/1625; G03B 15/224
USPC ...................... 264/40.1, 439, 484; 430/125.5
See application file for complete search history.

(56) References Cited

U.S. PATENT DOCUMENTS

| | | | |
|---|---|---|---|
| 8,459,280 B2 | 6/2013 | Swanson et al. | |
| 8,488,994 B2 | 7/2013 | Hanson et al. | |
| 8,765,045 B2 | 7/2014 | Zinniel | |
| 8,879,957 B2 | 11/2014 | Hanson et al. | |
| 2011/0186081 A1 | 8/2011 | Dunn et al. | |
| 2013/0075022 A1 | 3/2013 | Chillscyzn et al. | |
| 2013/0078013 A1* | 3/2013 | Chillscyzn | B29C 64/141 399/307 |
| 2013/0171431 A1* | 7/2013 | Swartz | B29C 64/141 156/499 |
| 2013/0186549 A1 | 7/2013 | Comb et al. | |
| 2013/0186558 A1 | 7/2013 | Comb et al. | |
| 2015/0024169 A1 | 1/2015 | Martin | |
| 2017/0355135 A1 | 12/2017 | Tombs | |

FOREIGN PATENT DOCUMENTS

| | | |
|---|---|---|
| EP | 3231580 | 10/2017 |
| JP | 2003195683 | 7/2003 |
| JP | 2014533210 | 12/2014 |
| WO | 2013044047 | 3/2013 |
| WO | 2019028030 | 2/2019 |
| WO | 2020236610 | 11/2020 |

OTHER PUBLICATIONS

"International Search Report and Written Opinion," for PCT Application No. PCT/US2020/033175 mailed Aug. 28, 2020 (11 pages).
"Communication Pursuant to Article 94(3) EPC," for European Patent Application No. 20810103.0 mailed Sep. 28, 2023 (6 pages).
"Extended European Search Report," for European Patent Application No. 20810103.0 mailed Dec. 14, 2022 (8 pages).
"First Office Action," for Chinese Patent Application No. 202080040168.9 mailed Mar. 14, 2024 (14 pages) with English translation.
"Office Action," for Japanese Patent Application No. 2021-568623 mailed Mar. 19, 2024 (11 pages).
"Response to Communication Pursuant to Rules 161(1) and 162 EPC," for European Patent Application No. 20810103.0 filed Jun. 28, 2022 (8 pages).
"Response to European Search Report," for European Patent Application No. 20810103.0 filed Jul. 10, 2023 (80 pages).

* cited by examiner

LAYER TRANSFUSION SEQUENCING FOR SELECTIVE DEPOSITION-BASED ADDITIVE MANUFACTURING

This application is being filed as a PCT International Patent application on May 15, 2020 in the name of Evolve Additive Solutions, Inc., a U.S. national corporation, applicant for the designation of all countries, and J. Samuel Batchelder, a U.S. Citizen, and Manish Boorugu, a U.S. Citizen, inventors for the designation of all countries, and claims priority to U.S. Provisional Patent Application No. 62/849,213 filed May 17, 2019, the contents of which are herein incorporated by reference in its entirety.

BACKGROUND

The present disclosure relates to systems and methods for additive manufacturing of three-dimensional (3D) parts, and more particularly, to additive manufacturing systems and processes for sequencing the characteristics of layers selectively transfused to build 3D parts and their support structures.

Additive manufacturing is generally a process for manufacturing a three-dimensional (3D) object by selective layer deposition utilizing a computer model of the objects. The basic operation of an additive manufacturing system consists of slicing a three-dimensional computer model into thin cross sections, translating the result into position data, and the position data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. In some instances, the host computer can optionally generate additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrostatographic 3D printing process, slices of the digital representation of the 3D part and its support structure are printed or developed using an electrophotographic engine. The electrostatographic engine generally operates in accordance with 2D electrophotographic printing processes, using charged powder materials that are formulated for use in building a 3D part (e.g., a polymeric toner material). The electrostatographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

In one aspect of the present disclosure, a method for making a three-dimensional (3D) part in a layerwise manner with an electrostatographic based additive manufacturing system includes establishing a first control parameter profile, establishing a second control parameter profile, establishing a transfusion sequence usable to transfuse a plurality of layers, and transfusing n+m layers on a bonding region of previously accumulated layers of the 3D part according to the transfusion sequence, where n and m are each a positive integer. The first control parameter profile includes a first combination of temperature and pressure parameters usable to transfuse a single layer of the 3D part, the second control parameter profile includes a second combination of temperature and pressure parameters usable to transfuse a single layer of the 3D part, and the second combination of temperature and pressure parameters is different from the first combination of temperature and pressure parameters. The transfusion sequence specifies the use of each of the first control parameter profile and the second control parameter profile in a specified order. Thermal energy is added to the previously accumulated layers from the bonding region to a thermal diffusion depth within the previously accumulated layers with transfusion of each layer, and a total thickness of the n+m layers is less than the thermal diffusion depth. The transfusion step includes transfusing n layers on the bonding region of previously accumulated layers of the 3D part according to the first control parameter profile, and, after transfusing the n layers, transfusing m layers on the bonding region of previously accumulated layers of the 3D part according to the second control parameter profile.

In another aspect of the present disclosure, a method for making a three-dimensional (3D) part in a layerwise manner with an electrostatographic based additive manufacturing system includes establishing a first control parameter profile, establishing a second control parameter profile, establishing a transfusion sequence usable to transfuse a plurality of layers, transfusing n+m layers on a bonding region of previously accumulated layers of the 3D part according to the transfusion sequence, where n and m are each a positive integer, and transfusing another n+m layers on the bonding region of previously accumulated layers of the 3D part according to the transfusion sequence. The first control parameter profile includes a first combination of temperature and force parameters usable to control the electrostatographic based additive manufacturing system to build a single layer of the 3D part, and is configured to build layers with relatively high performance in a first category and lower performance in a second category. The second control parameter profile includes a second combination of temperature and force parameters usable to control the electrostatographic based additive manufacturing system to build a single layer of the 3D part, and is configured to build layers with relatively high performance in the second category and lower performance in the first category. The second combination of temperature and force parameters is different from the first combination of temperature and force parameters. The transfusion sequence specifies the use of each of the first control parameter profile and the second control parameter profile in a specified order, and includes instructions to transfuse n layers on the bonding region of previously accumulated layers of the 3D part according to the first control parameter profile and to transfuse m layers on the bonding region of previously accumulated layers of the 3D part according to the second control parameter profile after transfusion of the n layers. Thermal energy is added to the previously accumulated layers from the bonding region to a thermal diffusion depth within the previously accumulated layers with transfusion of each layer, and a total thickness of the n+m layers is less than the thermal diffusion depth.

In another aspect, a method for making a three-dimensional (3D) part in a layerwise manner with an electrostatographic based additive manufacturing system includes establishing a first control parameter profile, establishing a second control parameter profile, establishing a transfusion sequence usable to perform transfusion assembly passes with a transfusion assembly of the electrostatographic based additive manufacturing system involving n+d transfusion assembly passes, where n and d are each a positive integer, transfusing n layers on a bonding region of previously accumulated layers of the 3D part according to the first control parameter profile, and performing d non-transfusing passes with the transfusion assembly such that at least one of the d non-transfusing passes is performed using the second control parameter profile. The first control parameter profile includes a first combination of parameters (e.g., temperature and pressure) usable to transfuse a single layer of the 3D part, the second control parameter profile includes a second combination of parameters, and the second combination of parameters is different from the first combination of parameters. The transfusion sequence specifies the use of each of the first control parameter profile and the second control parameter profile in a specified order to transfuse a plurality of layers. The d non-transfusing passes do not transfuse any a new layers on the bonding region.

The present summary is provided only by way of example, and not limitation. Other aspects of the present invention will be appreciated in view of the entirety of the present disclosure, including the entire text, claims and accompanying figures.

Definitions

Unless otherwise specified, the following terms as used herein have the meanings provided below:

The term "copolymer" refers to a polymer having two or more monomer species.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound.

The terms "at least one" and "one or more of" an element are used interchangeably, and have the same meaning that includes a single element and a plurality of the elements, and may also be represented by the suffix "(s)" at the end of the element.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

Figure 1:
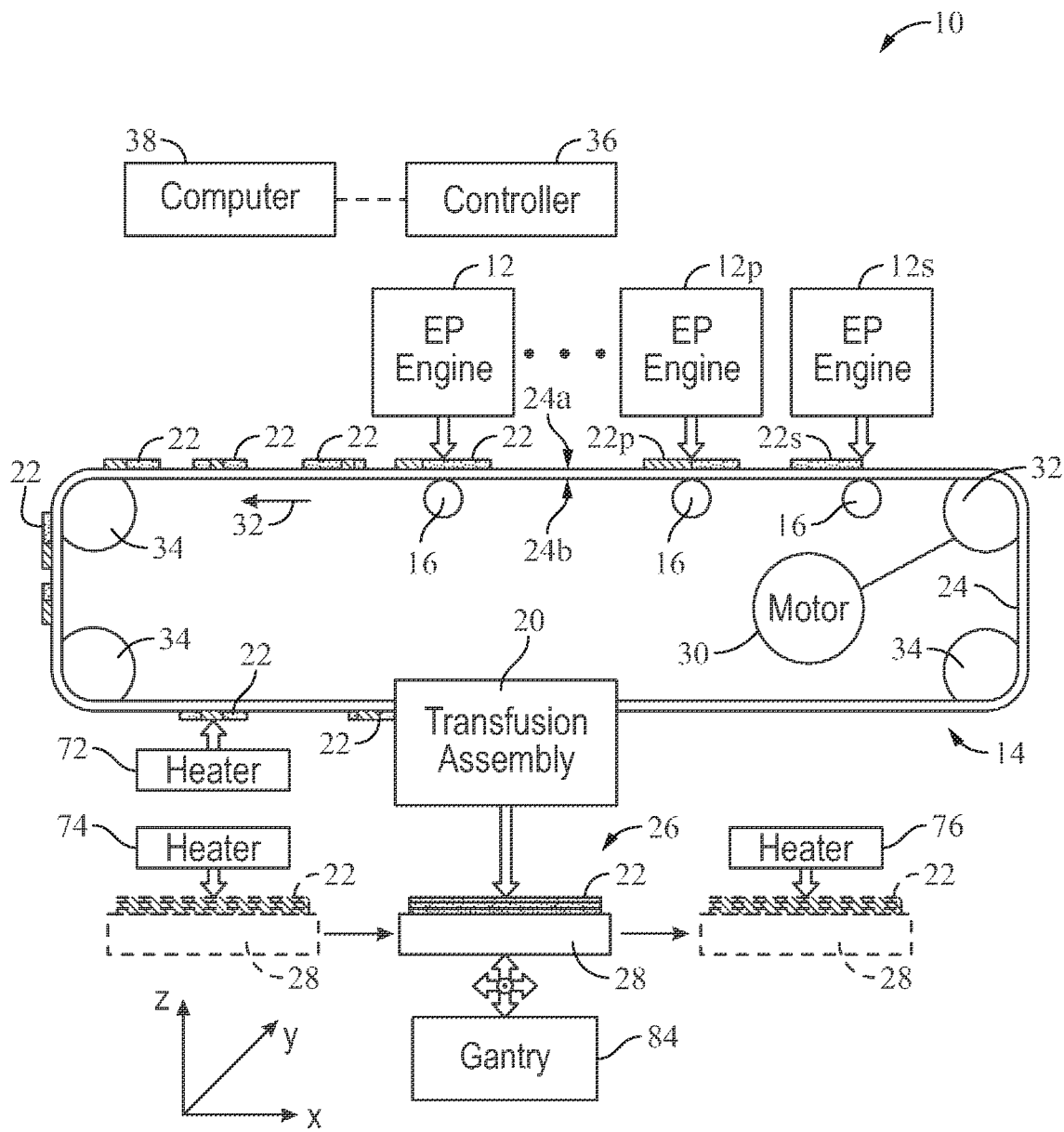
FIG. 1 is a simplified schematic front view of an example electrophotography-based additive manufacturing system for building 3D parts and associated support structures in a layerwise manner, in accordance with embodiments of the present disclosure.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory constitute more than mere transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during an electrostatographic 3D part additive manufacturing or printing operation, electrostatographic engines develop each layer of a 3D part out of charged powder materials (e.g., polymeric toners) using the electrostatographic process. A completed layer of the 3D part typically includes a part portion formed of part material by one electrostatographic engine that is transferred to a suitable transfer medium, such as a transfer belt or drum, and/or a support structure portion formed of support material by a different electrostatographic engine that is applied to the transfer medium in registration with the corresponding part portion. Alternatively, the part portion may be developed and transferred to the transfer medium in registration with a previously printed support structure portion on the transfer medium. Further, a plurality of layers can be imaged in a reverse order of printing and stacked one on top of the other on the transfer medium to form a stack of a selected thickness. In these ways, a layer can be composed of several superimposed or separate portions of part and/or support material.

The transfer medium delivers the developed layers or the stack of layers to a transfusion assembly where a transfusion process is performed to form a 3D structure in a layer-by-layer manner, a stack-by-stack manner or a combination of individual layers and stacks of layers to form the 3D part and corresponding support structure. During the transfusion process, heat and pressure fuse the developed layers or stacks of layers to build surfaces of the 3D structure. After the 3D structure is built, the support structures can then be dissolved or disintegrated in an aqueous solution or dispersion to reveal the completed 3D part.

Embodiments of the present disclosure provide a system and method for adjusting thermal profiles of layers, parts being built, and transfusion assembly components. Thermal flux devices, such as heater devices and cooler devices, can be used to selectively and controllably add thermal energy and remove thermal energy at various times and locations during a transfusion cycle for a given layer. The present disclosure allows for relatively efficient use of thermal resources, by reducing or eliminating unnecessary thermal energy accumulation in a part being built while at the same time promoting relatively quick and efficient layer transfusion cycle times. Other features, aspects and benefits of the present disclosure will be recognized in view of the entirety of the present disclosure, including the accompanying figures.

While the present disclosure can be utilized with any electrostatography-based additive manufacturing system, the present disclosure will be described in association with an electrophotography-based (EP) additive manufacturing system. However, the present disclosure is not limited to an EP based additive manufacturing system and can be utilized with any electrostatography-based additive manufacturing system.

FIG. 1 is a simplified diagram of an example electrophotography-based additive manufacturing system 10 for building 3D parts and associated support structures in a layer-by-layer manner, in accordance with embodiments of the present disclosure. While illustrated as building 3D parts and associated support structures in a layer-by-layer manner, the system 10 can also be used to form stacks of layers and transfuse the stacks to form the 3D parts and associated support structures.

As shown in FIG. 1, system 10 includes one or more electrophotographic (EP) engines, generally referred to as 12, such as EP engines 12a-d, a transfer assembly 14, at least one biasing mechanism 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Application Publication Nos. 2013/0186549 and 2013/0186558.

The EP engines 12 are imaging engines for respectively imaging or otherwise developing completed layers of the 3D part, which are generally referred to as 22, of the charged powder part and support materials. The charged powder part and support materials are each preferably engineered for use with the particular architecture of the EP engines 12. In some embodiments, at least one of the EP engines 12 of the system 10, such as EP engines 12a and 12c, develops layers of the support material to form the support structure portions 22s of a layer 22, and at least one of the EP engines 12, such as EP engines 12b and 12d, develops layers of the part material to form the part portions 22p of the layer 22. The EP engines 12 transfer the formed part portions 22p and the support structure portions 22s to a transfer medium 24. In some embodiments, the transfer medium 24 is in the form of a transfer belt, as shown in FIG. 1. The transfer medium 24 may take on other suitable forms in place of, or in addition to, the transfer belt, such as a transfer drum or sheet. Accordingly, embodiments of the present disclosure are not limited to the use of transfer mediums 24 in the form of the transfer belt.

In some embodiments, the system 10 includes at least one pair of the EP engines 12, such as EP engines 12a and 12b, which cooperate to form completed layers 22. In some embodiments, additional pairs of the EP engines 12, such as EP engines 12c and 12d, may cooperate to form other layers 22.

In some embodiments, each of the EP engines 12 that is configured to form the support structure portion 22s of a given layer 22 is positioned upstream from a corresponding EP engine 12 that is configured to form the part portion 22p of the layer 22 relative to a feed or in-track direction 32 of the transfer belt 24. Thus, for example, EP engines 12a and 12c that are each configured to form the support structure portions 22s are positioned upstream from their corresponding EP engines 12b and 12d that are configured to form the part portions 22p relative to the feed direction 32 of the transfer belt 24, as shown in FIG. 1. In alternative embodiments, this arrangement of the EP engines 12 may be reversed such that the EP engines that form the part portions 22p may be located upstream from the corresponding EP engines 12 that are configured to form the support structure portions 22s relative to the feed direction 32 of the transfer belt 24. Thus, for example, the EP engine 12b may be positioned upstream from the EP engine 12a, and the EP engine 12d may be positioned upstream of the EP engine 12c relative to the feed direction 32 of the transfer belt 24. In further embodiments, different groupings of EP engines 12 are possible (e.g., trios, quartets, etc.), such as where more than two materials are utilized, or where different materials have significantly different characteristics and more EP engines 12 are dedicated to some material or materials than others.

As discussed below, the developed layers 22 are transferred to a transfer medium 24 of the transfer assembly 14, which delivers the layers 22 to the transfusion assembly 20. The transfusion assembly 20 operates to build a 3D structure 26, which includes the 3D part 26p, support structures 26s and/or other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al. (U.S. Patent Application Publication Nos. 2013/0186549 and 2013/0186558). In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The exemplary transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

System 10 also includes a controller 36, which represents one or more processors that are configured to execute instructions, which may be stored locally in memory of the system 10 or in memory that is remote to the system 10, to control components of the system 10 to perform one or more functions described herein. In some embodiments, the processors of the controller 36 are components of one or more computer-based systems. In some embodiments, the controller 36 includes one or more control circuits, microprocessor-based engine control systems, one or more programmable hardware components, such as a field programmable gate array (FPGA), and/or digitally-controlled raster imaging processor systems that are used to control components of the system 10 to perform one or more functions described herein. In some embodiments, the controller 36 controls components of the system 10 in a synchronized manner based on printing instructions received from a host computer 38 or from another location, for example.

In some embodiments, the controller 36 communicates over suitable wired or wireless communication links with the components of the system 10. In some embodiments, the controller 36 communicates over a suitable wired or wireless communication link with external devices, such as the host computer 38 or other computers and servers, such as over a network connection (e.g., local area network (LAN) connection), for example.

In some embodiments, the host computer 38 includes one or more computer-based systems that are configured to communicate with the controller 36 to provide the print instructions (and other operating information). For example, the host computer 38 may transfer information to the controller 36 that relates to the sliced layers of the 3D parts and support structures, thereby allowing the system 10 to print the layers 22 and form the 3D part including any support structures in a layer-by-layer manner.

The components of system 10 may be retained by one or more frame structures. Additionally, the components of system 10 may be retained within an enclosable housing (not shown) that prevents components of the system 10 from being exposed to ambient light during operation, and which helps control the temperature and humidity of the air circulating through the system.

Figure 2:
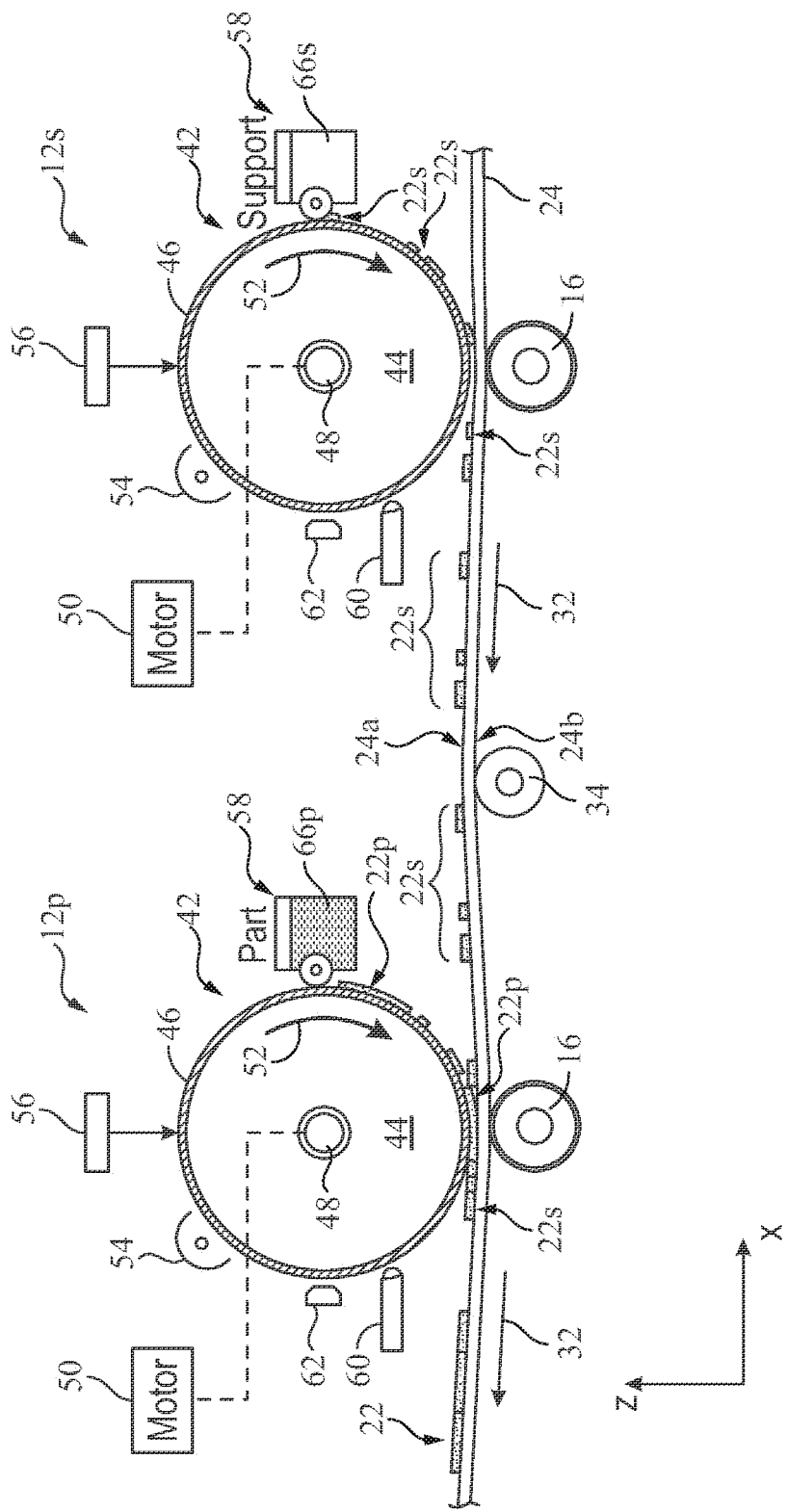
FIG. 2 is a schematic front view of example electrophotographic engines, in accordance with embodiments of the present disclosure.

FIG. 2 is a schematic front view of the EP engines 12a and 12b of the system 10, in accordance with exemplary embodiments of the present disclosure. In the shown embodiment, the EP engines 12a and 12b may include the same components, such as a photoconductor drum 42 having a conductive body 44 and a photoconductive surface 46. The conductive body 44 is an electrically-conductive body (e.g., fabricated from copper, aluminum, tin, or the like), that can be electrically grounded (or biased to a particular voltage other than ground) and configured to rotate around a shaft 48. The shaft 48 is correspondingly connected to a drive motor 50, which is configured to rotate the shaft 48 (and the photoconductor drum 42) in the direction of arrow 52 at a substantially constant rate. While embodiments of the EP engines 12 are discussed and illustrated as utilizing a photoconductor drum 42, a belt having a conductive material, or other suitable bodies, may also be utilized in place of the photoconductor drum 42 and the conductive body 44.

The photoconductive surface 46 is a thin film extending around the circumferential surface of the conductive body 44 (shown as a drum but can alternatively be a belt or other suitable body), and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers 22 of the 3D part 26p, or support structure 26s.

As further shown, each of the exemplary EP engines 12a and 12b also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46, while the drive motor 50 and the shaft 48 rotate the photoconductor drum 42 in the direction 52.

The EP engines 12 use the charged particle material (e.g., a relatively poor electrical conductor such as polymeric or thermoplastic toner, a ceramic or magnetic material, etc.), generally referred to herein as 66, to develop or form the layers 22. In some embodiments, the image-forming assembly for the surface 46 of the EP engine 12a is used to form support structure portions 22s of the support material 66s, where a supply of the support material 66s may be retained by the development station 58 (of the EP engine 12a) along with carrier particles. Similarly, the image-forming assembly for the surface 46 of the EP engine 12b is used to form part portions 22p of the part material 66p, where a supply of the part material 66p may be retained by the development station 58 (of the EP engine 12b) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

The imager 56 is a digitally-controlled, pixel-wise light exposure apparatus configured to selectively emit electromagnetic radiation toward the uniform electrostatic charge on the surface 46 as the surface 46 rotates in the direction 52 past the imager 56. The selective exposure of the electromagnetic radiation to the surface 46 is directed by the controller 36, and causes discrete pixel-wise locations of the electrostatic charge to be removed (i.e., discharged), thereby forming latent image charge patterns on the surface 46.

Suitable devices for the imager 56 include scanning laser (e.g., gas or solid-state lasers) light sources, light emitting diode (LED) array exposure devices, and other exposure devices conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. In accordance with this embodiment, the charge inducer 54 may be eliminated. In some embodiments, the electromagnetic radiation emitted by the imager 56 has an intensity that controls the amount of charge in the latent image charge pattern that is formed on the surface 46. As such, as used herein, the term "electrophotography" can broadly be considered as "electrostatography," or a process that produces a charge pattern on a surface. Alternatives also include such things as ionography.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s, and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged particles of the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s on the surface 46 as the photoconductor drum 42 continues to rotate in the direction 52, where the successive layers 22p or 22s correspond to the successive sliced layers of the digital representation of the 3D part or support structure.

In some embodiments, the thickness of the layers 22p or 22s on the surface 46 depends on the charge of the latent image charge pattern on the surface. Thus, the thickness of the layers 22p or 22s may be controlled through the control of the magnitude of the charge in the pattern on the surface using the controller 36. For example, the controller 36 may control the thickness of the layers 22p or 22s by controlling the charge inducer 54, by controlling the intensity of the electromagnetic radiation emitted by the imager 56, or by controlling the duration of exposure of the surface 46 to the electromagnetic radiation emitted by the imager 56, for example.

The successive layers 22p or 22s are then rotated with the surface 46 in the direction 52 to a transfer region in which layers 22p or 22s are successively transferred from the photoconductor drum 42 to the belt 24 or another transfer medium, as discussed below. While illustrated as a direct engagement between the photoconductor drum 42 and the belt 24, in some preferred embodiments, the EP engines 12a and 12b may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22s and 22p from the EP engines 12a and 12b to the belt 24. Because the layers 22s and 22p are each only a single layer increment in thickness at this point in the process, electrostatic attraction is suitable for transferring the layers 22s and 22p from the EP engines 12a and 12b to the belt 24. In some embodiments, the thickness of the layers 22p or 22s on the surface 24a of the belt 24 depends on the electrical potential induced through the belt by the corresponding biasing mechanism 16. Thus, the thickness of the layers 22p or 22s may be controlled by the controller 36 through the control of the magnitude of the electrical potential induced through the belt by the biasing mechanisms 16.

The controller 36 preferably controls the rotation of the photoconductor drums 42 of the EP engines 12a and 12b at the same rotational rates that are synchronized with the line speed of the belt 24 and/or with any intermediary transfer drums or belts. This allows the system 10 to develop and transfer the layers 22s and 22p in coordination with each other from separate developer images. In particular, as shown, each part of the layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s, or may only include part material 66p, depending on the particular support structure and 3D part geometries and layer slicing.

In an alternative embodiment, the part portions 22p and the support structure portions 22s may optionally be developed and transferred along the belt 24 separately, such as with alternating layers 22s and 22p. These successive, alternating layers 22s and 22p may then be transferred to the layer transfusion assembly 20, where they may be transfused separately to print or build the structure 26 that includes the 3D part 26p, the support structure 26f, and/or other structures.

Figure 3:
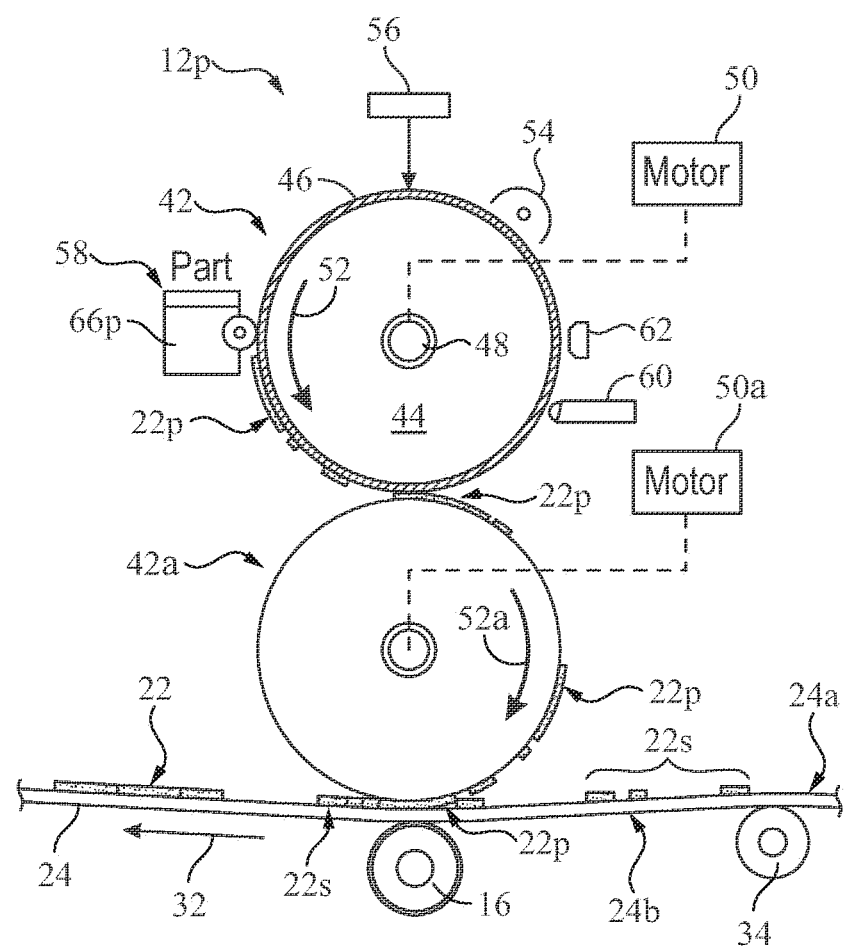
FIG. 3 is a schematic front view of an example electrophotographic engine, which includes a transfer drum or belt, in accordance with embodiments of the present disclosure.

In a further alternative embodiment, one or both of the EP engines 12a and 12b may also include one or more transfer drums and/or belts between the photoconductor drum 42 and the belt or transfer medium 24. For example, as shown in FIG. 3, the EP engine 12b may also include an intermediate transfer drum 42a that rotates in the direction 52a that opposes the direction 52, in which drum 42 is rotated, under the rotational power of motor 50a. The intermediate transfer drum 42a engages with the photoconductor drum 42 to receive the developed layers 22p from the photoconductor drum 42, and then carries the received developed layers 22p and transfers them to the belt 24.

The EP engine 12a may include the same arrangement of an intermediate transfer drum 42a for carrying the developed layers 22s from the photoconductor drum 42 to the belt 24. The use of such intermediary transfer drums or belts for the EP engines 12a and 12b can be beneficial for thermally isolating the photoconductor drum 42 from the belt 24, if desired.

Figure 4:
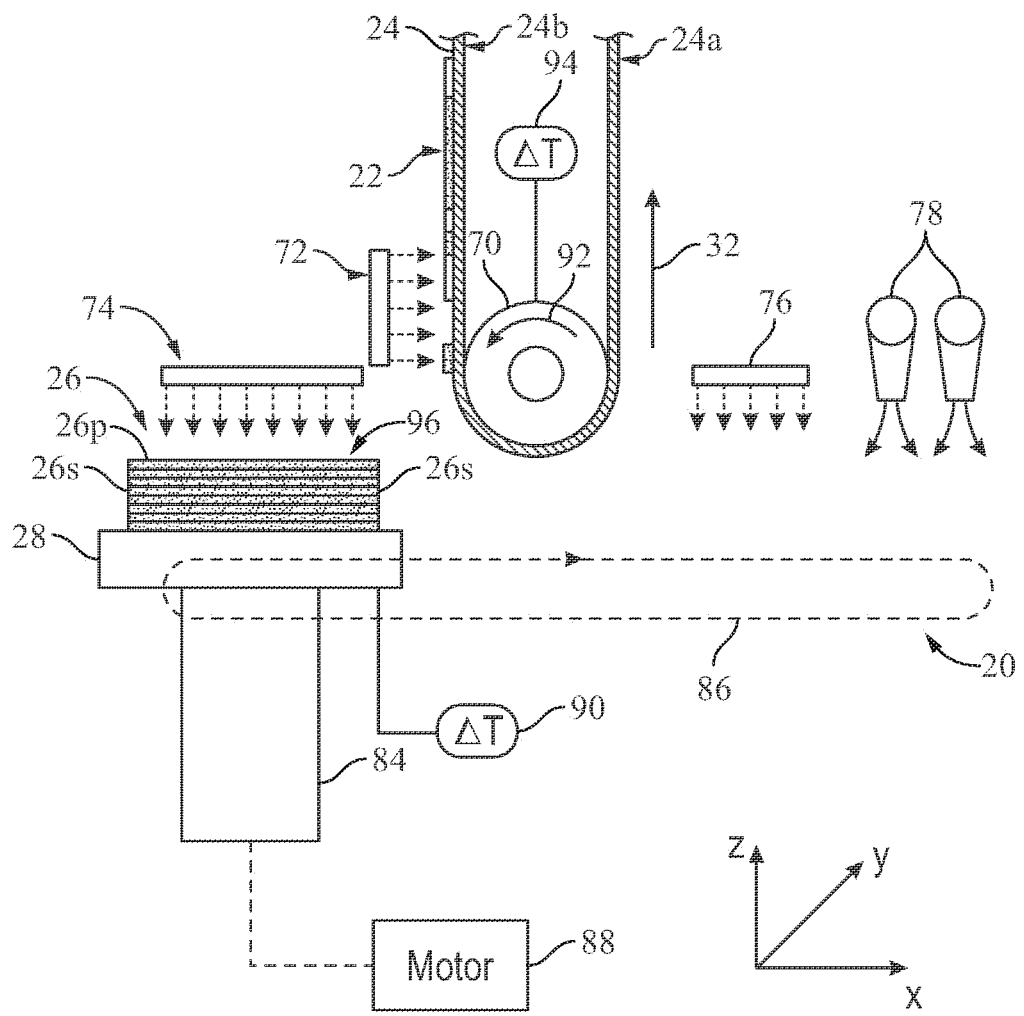
FIG. 4 is a schematic front view of an example layer transfusion assembly, in accordance with embodiments of the present disclosure.

FIG. 4 illustrates an embodiment of the layer transfusion assembly 20. As shown, the transfusion assembly 20 includes the build platform 28, a nip roller 70, pre-transfusion heaters 72 and 74, an optional post-transfusion heater 76, and air jets 78 (or other cooling units). The build platform 28 is a platform assembly or platen of system 10 that is configured to receive the heated combined layers 22 (or separate layers 22p and 22s) for printing the part 26, which includes a 3D part 26p formed of the part layers 22p, and support structure 26s formed of the support layers 22s, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which can be configured to move the build platform 28 along the z-axis and the x-axis (and, optionally, also the y-axis), as illustrated schematically in FIG. 1 (the y-axis being into and out of the page in FIG. 1, with the z-, x- and y-axes being mutually orthogonal, following the right-hand rule). The gantry 84 may produce cyclical movement patterns relative to the nip roller 70 and other components, as illustrated by broken line 86 in FIG. 4. The particular movement pattern of the gantry 84 can follow essentially any desired path suitable for a given application. The gantry 84 may be operated by a motor 88 based on commands from the controller 36, where the motor 88 may be an electrical motor, a hydraulic system, a pneumatic system, or the like. In one embodiment, the gantry 84 can included an integrated mechanism that precisely controls movement of the build platform 28 in the z- and x-axis directions (and optionally the y-axis direction). In alternate embodiments, the gantry 84 can include multiple, operatively-coupled mechanisms that each control movement of the build platform 28 in one or more directions, for instance, with a first mechanism that produces movement along both the z-axis and the x-axis and a second mechanism that produces movement along only the y-axis. The use of multiple mechanisms can allow the gantry 84 to have different movement resolution along different axes. Moreover, the use of multiple mechanisms can allow an additional mechanism to be added to an existing mechanism operable along fewer than three axes.

In the illustrated embodiment, the build platform 28 can be heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Publication Nos. 2013/0186549 and 2013/0186558. This allows the build platform 28 to assist in maintaining 3D part 26p and/or support structure 26s at this average part temperature.

The nip roller 70 is an example heatable/coolable element or heatable/coolable layer transfusion element, which is configured to rotate around a fixed axis with the movement of the belt 24. In particular, the nip roller 70 may roll against the rear surface 22s in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22. In further embodiments, a cooling element such as an air knife can be used to cool the nip roller 70.

The pre-transfusion heater 72 includes one or more heating devices (e.g., an infrared heater and/or a heated air jet) that are configured to heat the layers 22 on the belt 24 to a selected temperature of the layer 22, such as up to a fusion temperature of the part material 66p and the support material 66s, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, and in one embodiment to supply heat to the layer upon contact.

Optional post-transfusion heater 76 is located downstream from nip roller 70 and upstream from air jets 78, and is configured to heat the transfused layers 22 to an elevated temperature.

As mentioned above, in some embodiments, prior to building the part 26 on the build platform 28, the build platform 28 and the nip roller 70 may be heated to their selected temperatures. For example, the build platform 28 may be heated to the average part temperature of 3D part 26p and support structure 26s. In comparison, the nip roller 70 may be heated to a desired transfer temperature for the layers 22, which may be cooler than a peak transfuse temperature because it may be desirable for a nip entrance to be hot (for fusing build material particles together) and a nip exit to be cooler (for reduced adhesion to the belt 24).

As further shown in FIG. 4, during operation, the gantry 84 may move the build platform 28 (with 3D part 26p and support structure 26s) in a reciprocating pattern 86. In particular, the gantry 84 may move the build platform 28 along the x-axis below, along, or through the heater 74. The heater 74 heats the top surfaces of 3D part 26p and support structure 26s to an elevated temperature, such as the transfer temperatures of the part and support materials. As discussed in Comb et al., U.S. Patent Application Publication Nos. 2013/0186549 and 2013/0186558, the heaters 72 and 74 may heat the layers 22 and the top surfaces of 3D part 26p and support structure 26s to about the same temperatures to provide a consistent transfusion interface temperature. Alternatively, the heaters 72 and 74 may heat layers 22 and the top surfaces of 3D part 26p and support structure 26s to different temperatures to attain a desired transfusion interface temperature.

The continued rotation of the belt 24 and the movement of the build platform 28 align the heated layer 22 with the heated top surfaces of 3D part 26p and support structure 26s with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24b of the belt 24 to rotate around the nip roller 70 to nip the belt 24 and the heated layer 22 against the top surfaces of 3D part 26p and support structure 26s. This presses the heated layer 22 between the heated top surfaces of 3D part 26p and support structure 26s at the location of the nip roller 70, which at least partially transfuses the heated layer 22 to the top layers of 3D part 26p and support structure 26s that form a build surface 96.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24.

After release, the gantry 84 continues to move the build platform 28 along the x-axis to the post-transfusion heater 76. At optional post-transfusion heater 76, the top-most layers of 3D part 26p and the support structure 26s (including the transfused layer 22) may then be heated to at least the fusion temperature of the thermoplastic-based powder in a post-fuse or heat-setting step. This optionally heats the material of the transfused layer 22 to a highly fusible state such that polymer molecules of the transfused layer 22 quickly interdiffuse to achieve a high level of interfacial entanglement with 3D part 26p.

Additionally, as the gantry 84 continues to move the build platform 28 along the x-axis past the post-transfusion heater 76 to the air jets 78, the air jets 78 blow cooling air towards the top layers of 3D part 26p and support structure 26s. This actively cools the transfused layer 22 down to or below the average part temperature, as discussed in Comb et al., U.S. Patent Application Publication Nos. 2013/0186549 and 2013/0186558.

To assist in keeping the 3D part 26p and support structure 26s at the average part temperature, in some preferred embodiments, the heater 74 and/or the heater 76 may operate to heat only the top-most layers of 3D part 26p and support structure 26s. For example, in embodiments in which heaters 72, 74, and 76 are configured to emit infrared radiation, the 3D part 26p and support structure 26s may include heat absorbers and/or other colorants configured to restrict penetration of the infrared wavelengths to within the top-most layers. Moreover, infrared radiation penetration into the part 26p and support structure 26s may be substantially less than a thermal diffusion depth ($D_{TD}$) related to thermal diffusivity within the accumulated layers and the length of time a heated surface is permitted to diffuse heat into the accumulated layers, as explained further below. Alternatively, the heaters 72, 74, and 76 may be configured to blow heated air across the top surfaces of 3D part 26p and support structure 26s. In either case, limiting the thermal penetration into 3D part 26p and support structure 26s allows the top-most layers to be sufficiently transfused, while also reducing the amount of cooling required to keep 3D part 26p and support structure 26s at the average part temperature.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26p/support structure 26s upward for proper registration with the next layer 22. The same process may then be repeated for each remaining layer 22 of 3D part 26p and support structure 26s.

After the transfusion operation is completed, the resulting 3D part 26p and support structure 26s may be removed from system 10 and undergo one or more post-printing operations. For example, support structure 26s may be sacrificially removed from 3D part 26p using an aqueous-based solution, such as an aqueous alkali solution. Under this technique, support structure 26s may at least partially dissolve in the solution, separating it from 3D part 26p in a hands-free manner.

In comparison, part materials are chemically resistant to aqueous alkali solutions. This allows the use of an aqueous alkali solution to be employed for removing the sacrificial support structure 26s without degrading the shape or quality of 3D part 26p. Examples of suitable systems and techniques for removing support structure 26s in this manner include those disclosed in Swanson et al., U.S. Pat. No. 8,459,280; Hopkins et al., U.S. Pat. No. 8,246,888; and Dunn et al., U.S. Patent Application Publication No. 2011/0186081; each of which are incorporated by reference to the extent that they do not conflict with the present disclosure.

Furthermore, after support structure 26s is removed, 3D part 26p may undergo one or more additional post-printing processes, such as surface treatment processes like sand blasting and ball rolling. Examples of suitable surface treatment processes include those disclosed in Priedeman et al., U.S. Pat. No. 8,123,999; and in Zinniel, U.S. Pat. No. 8,765,045.

In alternate embodiments, transfusion assembly 20 can utilize an optional planishing roller or pressing element that serves to compact a layer to reduce voids, potentially to heat a layer to remove at least some moisture and solvents, and/or to create films that support tensile loading. Planishing of a given layer 22 can occur before that layer 22 is transfused with accumulated layers of the part 26.

Figure 5:
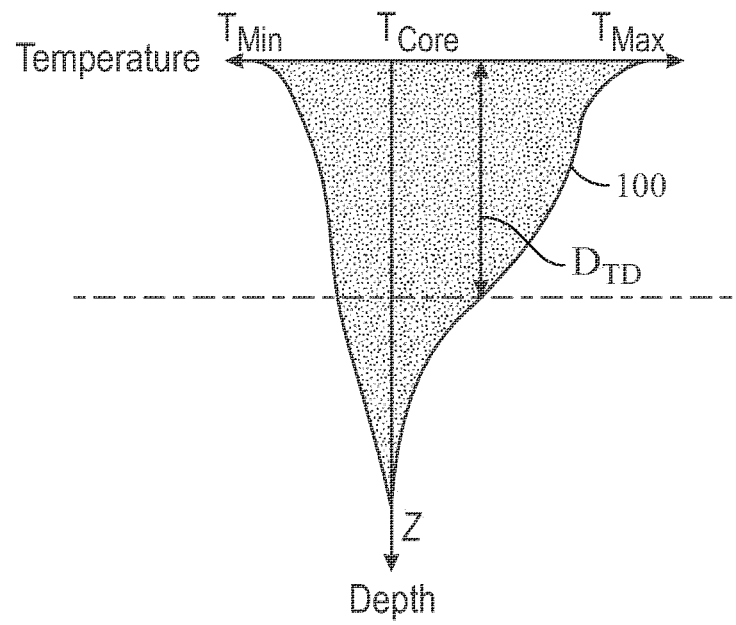
FIG. 5 is a graph of temperature versus depth schematically illustrating an example cyclical temperature swing for the building of a given layer of a 3D part.

When transfusing layers 22 to build the 3D part 26, the accumulated layers of the part 26 undergo a cyclical temperature swing associated with the transfusion of each new layer 22. FIG. 5 is a graph of temperature versus depth schematically illustrating an example cyclical temperature swing for the building of a given layer of a 3D part over $\tau_{layer}$, the cycle time for transfusion of a given layer 22. As shown in FIG. 5, the vertical z-axis represents depth from the build surface 96 into accumulated layers of the 3D part 26, and the horizontal axis represents temperature. The stippled region 100 plotted on the graph of FIG. 5 depicts the cyclical temperature fluctuations at different depths within the accumulated layers of the 3D part 26, from a relative minimum temperature $T_{min}$ (at a left-side boundary in FIG. 5) to a relative maximum temperature $T_{max}$ (at a right-side boundary in FIG. 5). A core temperature $T_{core}$ of the previously accumulated layers of the part 26 is indicated, and represents the bulk temperature of a substantial portion of the previously accumulated layers of the part 26 away from the build surface 96.

Generally, in at least one embodiment of a build process, a layer 22 to be transfused onto the accumulated layers of the 3D part 26 at the build surface 96 are heated while being conveyed to a heatable transfusion nip element 70 (e.g., nip roller or another suitable pressing element), such as by the heater 72. Concurrently, the accumulated layers of the 3D part 26 are heated while the layer 22 is being conveyed, such as by the heater 74, a build platform heater, etc. The heatable transfusion nip element 70 can also be heated while the layer 22 is being conveyed. Therefore, the temperature in the accumulated layers of the 3D part 26 generally increases over a first part of the cycle time $\tau_{layer}$, with the first part of the cycle time $\tau_{layer}$ occurring at least through the time the layer 22 reaches the heatable transfusion nip element 70. Where a post-transfusion heater 76 is used, the first part of the cycle time $\tau_{layer}$ can continue after the accumulated layers of the 3D part 26 with the newly-transfused layer 22 passes the heatable transfusion nip element 70 and until the accumulated layers of the 3D part 26 pass the post-transfusion heater 76.

After the passing the heatable transfusion nip element 70 (and any post-transfusion heater 76), the accumulated layers of the 3D part 26 with the newly-transfused layer 22 can be cooled, such as with the air jets 78 that blow cooling air at the build surface 96 where the new layer 22 was just transfused. Therefore, the temperature in the accumulated layers of the 3D part 26 generally decreases over a last part of the cycle time $\tau_{layer}$, with the last part of the cycle time $\tau_{layer}$ occurring after the time the layer 22 passes the heatable transfusion nip element 70 and any post-transfusion heater 76.

As just described, the temperature within the region 100 shown in FIG. 5 at shallow depths generally increases then decreases during the cycle time $\tau_{layer}$. However, it should be noted that in further embodiments more complex temperature fluctuations are possible, such as though the use of staged heating and cooling cycles before and/or after transfusion. Moreover, the cycle time $\tau_{layer}$ and other transfusion-related properties (such as the degree of heating and cooling) can vary layer-to-layer in some embodiments.

The core temperature $T_{core}$ of the accumulated layers of the 3D part 26 can remain substantially constant at significant depths, which is depicted in FIG. 5 by a narrow, peaked shape of the region 100 that is nearly linear at the greatest z-axis depths. While the core temperature $T_{core}$ can vary across multiple layer transfusion operations, depending on heating and cooling operations performed by the system 10, in some embodiments the core temperature $T_{core}$ can be maintained at a substantially constant bulk temperature across multiple layer transfusions, or even across most or all layer transfusions. In some embodiments, the core temperature $T_{core}$ can be maintained with a desired depth-dependent variation, such as to substantially linearly decline toward the greatest z-axis depths.

A thermal diffusion depth $D_{TD}=\sqrt{\tau_{layer}\kappa/\pi}$, where $\tau_{layer}$ is the cycle time for the surface temperature to vary sinusoidally about an average temperature for a given layer (e.g., between heating and cooling of the accumulated layers of the 3D part 26) and $\kappa$ is the thermal diffusivity for the part and/or support build material (e.g., a polymeric toner). An arbitrary temperature profile for a layer can be expressed as a superposition of such layer times, and the resulting thermal depth becomes a weighted average of these times. For example, a system with a 4.2 second layer time spends 0.6 seconds heating the layer and 1.8 seconds cooling the layer, for an effective $\tau_{layer}$ of about 2.4 seconds. The thermal diffusion depth $D_{TD}$ represents a characteristic distance that thermal energy diffuses from the build surface 96 into the accumulated layers of the 3D part 26 during the cycle time $\tau_{layer}$. In one example embodiment, the build material thermal diffusivity $\kappa$ is 180 mil$^2$/s and the cycle time $\tau_{layer}$ is 2.4 seconds, such that the thermal diffusion depth $D_{TD}$ is 298 μm (11.7 mil). If layer thicknesses ($\Gamma$) are 20 μm (0.8 mil), then the thermal diffusion depth $D_{TD}$ in this example is the equivalent of the thickness of about fifteen layers. The thermal diffusion depth $D_{TD}$ can be in a range of approximately 125 to 750 μm in some embodiments.

In some electrostatography-based additive manufacturing processes, fusion of the layers might be termed a sedimentary process, where the number of transfusion pressures experienced by the part being built removes substantially all voids from the part. However, in some alternative processes, the part is porous (with lower density) at the most recently transferred layer, becoming fully fused some ten to twenty layers into the part.

Once pressed into a melt, toner particles quickly come up to temperature. By way of example, the thermal diffusivity of ABS filament and soluble support material, sold by Stratasys, Inc. located in Eden Prairie, Minnesota, are roughly $\kappa=160$ mil$^2$/s at fusion temperatures. Example toner particles used in EP build processes are about $s=0.82$ mils=21 microns in diameter. The thermal diffusion time associated with heat diffusing a distance of one particle diameter is 0.82/160=4.2 milliseconds.

Once melted, the new toner particles of a layer 22 are flattened into a film as they flow and are cast against the transfer medium 24, leaving a consolidated part surface with significantly less, if any, pores. In this flattening process, lower temperature ("cold") toner particles of a new layer 22 are pressed by the pressing component 70 (e.g. in the form of a nip roller) and the transfer medium 24 into one or more previously accumulated layers of the part 26 at a higher temperature. Below the bonding region of the part 26, at least a bulk region of the part located away from the build surface 96 can remain at a lower temperature. Another advantage of pressing a layer of toner into a melt is that gas that evolves from heating the toner particles (such as water vapor) is more inclined to reside at the layer-belt interface than in trapped voids in the part.

Thus, in some embodiments, instead of using a sedimentary process where gradual consolidation of a layer of part material occurs as an increasing number of subsequent layers are applied, a layer of part material can instead be fully consolidated as it is applied by pressing the layer into a rapidly heated part surface, and then subsequently cooled. Using disclosed methods, the materials rapidly inter-diffuse across the interface, then the combination is cooled. In this process, less heat is required, because the thermal diffusion depth $D_{TD}$ is shallower. However, the presently-disclosed embodiments can still be used with a sedimentary process.

Different combinations of control parameters governing the system 10 produce different performance characteristics in built 3D parts 26. In at least some instances, combinations of control parameters result in performance tradeoffs, each having both positive and negative aspects. For instance, if a layer 22 is transfused relatively "hot" (that is, with a relatively hot build surface 96), the strength of the layer in the resultant part 26 can be very good; but the air cooling impingement velocity from the air jets 78 has to be relatively high to remove the extra heat from the "hot" transfusion, which tends to cause relatively fragile structures like shelves or bridges to fail. Bridging occurs with a given layer is transfused over a gap, hole, opening or the like in the bonding region of previously accumulated layers. Shelving occurs when a given layer overhangs the bonding region of the previously accumulated layers by more than a threshold amount (e.g., by more than the thickness of a layer). If relatively mild or low impingement air cooling on the build surface 96 from the air jets 78 is used instead, the new layer 22 can better shelve or bridge over random printing defects; but the transfuse temperature needs to be reduced to keep from overheating the core of the part 26, which tends to reduce the strength of the resultant fused part 26. If a relatively high force or pressure from the transfuse nip element 70 is used, the toner particles come into intimate contact, allowing the polymer chains to reptate and create a relatively strong part; but such high transfuse nip element pressure can generate creep and flow in the core of the part 26, tending to cause the geometric accuracy of the resultant part 26 to deteriorate. If instead a relatively low transfuse nip element pressure is used, the geometric features of the resultant part 26 generally remain in their as-printed positions in space; but the lower pressure generates a relatively weaker part 26.

Figure 6:
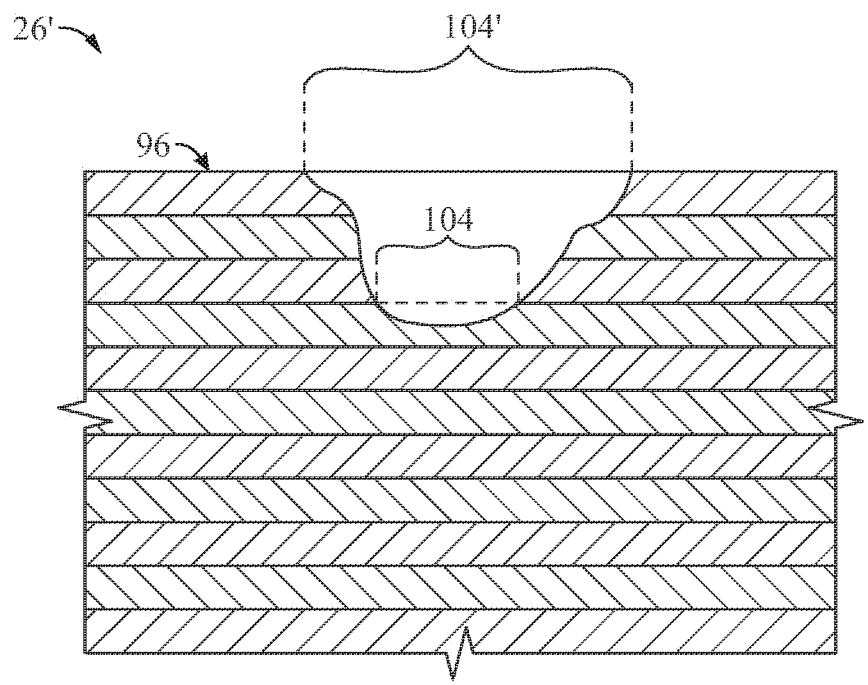
FIG. 6 is a cross-sectional view of a 3D part schematically illustrating a building error void growing through a series of relatively hot layer transfusions.
Figure 7:
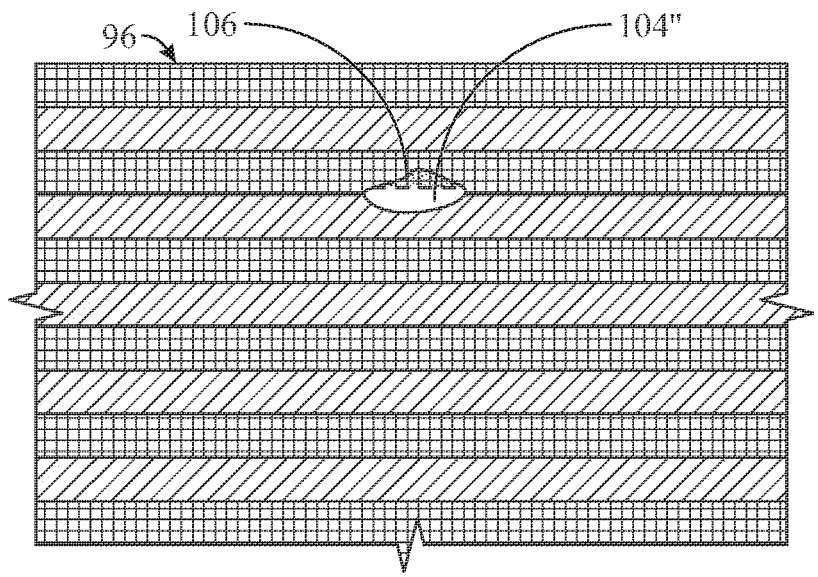
FIG. 7 is a cross-sectional view of a 3D part schematically illustrating a building error void bridged through a series of relatively cold layer transfusions.

FIGS. 6 and 7 illustrate some examples of the tradeoffs just discussed. FIG. 6 is a cross-sectional view of a 3D part 26' schematically illustrating a building error void 104 growing through a series of all relatively hot layer transfusions into large void 104'. With relatively hot layer transfusions, relatively high cooling air flows from post-transfusion air jets 78 is usually required. Such high cooling air flows can act like an air knife that can cause shelf and/or bridge structures to fail through cooling air shear effects. Unintuitively, such void enlargement effects in relatively high-temperature built parts 26' may be more prone to failure, even though relatively hot transfusions generally produce mechanically stronger inter-layer bonds and resultant parts, because destructive levels of air cooling are often required to maintain suitable part temperatures. Failures of shelves and/or bridges or the presence of voids that have grown to significant sizes may lead to rejection of the resultant part 26'. Even if the part 26' with the large void 104' is acceptable, the presence of the large void 104' can cause at least a local reduction of part strength.

FIG. 7 is a cross-sectional view of a 3D part 26" schematically illustrating a building error void 104" contained or "healed" by a bridge 106 through a series of all relatively cold layer transfusions. With relatively cold layer transfusions, cooling air flows from post-transfusion air jets 78 can be relatively mild, which can avoid air knife effects that can cause shelf and/or bridge structures to fail through cooling air shear effects. Therefore, while the relatively low-temperature built part 26" may generally produce, on average, weaker inter-layer bonds than with relatively hot layer transfusions, the overall impact of the building defect (void) 104" on the part 26" is constrained and healed by the ability to maintain the structural integrity of the bridge 106 and the subsequent transfusion of additional layers.

When the parts 26' and 26" shown in FIGS. 6 and 7 are made using entirely "hot" or "cold" layer transfusions, the types of tradeoffs discussed above tend to persist. However, by building a 3D part according to a sequence of control parameter profiles that differ, alternate or otherwise vary across multiple layer transfusions, the positive aspects of each control parameter profile can be realized. In this way coarse performance tradeoffs can be at least partially transcended, with the sequencing providing a blended set of performance benefits that can promote positive performance characteristics and reduce the risk of negative effects of particular control parameter profiles (such as avoiding a risk of building error voids growing unacceptably large in a series of relatively "hot" layer transfusions). For example, a first control parameter profile can be configured to build layers with relatively high performance in a first category (e.g., 3D part fracture strength or reliable transfer of a layer from a transfer medium to the part build surface) and lower performance in a second category (e.g., quality of bridge or shelf formation), while a second control parameter profile can be configured to build layers with relatively high performance in the second category and lower performance in the first category. The number and type of controllable parameters of the profiles and transfusion sequence (e.g., temperature and pressure or force parameters) will vary depending upon the particular configuration of a given electrophotography-based additive manufacturing system 10, such as based on the type, number and location of heating, cooling and pressure-application elements of the system 10. Moreover, the individual parameters of a given control parameter profile can be constant values, a range or window of proscribed values, a time-dependent polynomial function, a slew rate limitation, etc., and the given control parameter profile can include combinations of different types of parameters (e.g., with some parameters being constants and others being a range of values). Control parameter profiles can specify targets (open-loop control parameters for relevant components of system 10) or actual (sensed) values, or combinations of targets and actual values. The use of actual values in control parameter profiles generally requires that the system 10 provide suitable sensors in order to provide sensed data used to implement actual value control as a function of closed-loop sensor feedback. The transfusion sequence and control parameter profiles can be implemented by the controller 36, and can be implemented via computer or processor-readable instructions.

For example, in some embodiments, a cycle of two different control parameter profiles can be used to establish the transfusion sequence. However, sequences of more than two control parameter profiles can also be used that may have a regular pattern (e.g., each control parameter profile is used in turn as a cycle with the cycle then beginning again to build a desired number of layers) or a more complex irregular pattern (e.g., two different profiles alternate with a third different profile used every certain number of layers, such as a third profile used every seventh layer in the sequence), as desired. In some embodiments, the transfusion sequence can include a combination of any suitable number of different control parameter profiles that builds a plurality of layers of a 3D part with those layers built according to the transfusion sequence having a collective thickness that is less than, or significantly less than, the thermal diffusion depth $D_{TD}$, so that temperature and pressure applied to the build surface 96 can be expected to fuse within the accumulated layers of the 3D part regardless of the specific control parameters of a given control parameter profile (e.g., even if a given layer is transfused relatively "cold"). Further, in some embodiments, multiple transfusion sequences can be established and then a given transfusion sequence selected for use with a desired number of layer transfusions and a different transfusion sequence selected for use with a desired number of further layer transfusions. Such selection of different transfusion sequences can allow for sequences tailored to particular characteristics of portions of builds, such as a relatively simple transfusion sequence used for layers made mostly or entirely of support material and a more complex transfusion sequence used for layers made of a significant amount of part material in which build error tolerances are tighter. In some still further embodiments, a transfusion sequence can include mode switching in which one or more dummy transfusion passes in which a new layer is not transfused onto a part build surface but other typical transfusion heating, cooling and pressure application steps are performed. It should be noted that for some applications, transfusion sequences can be begun but not fully completed, such as where a part is fully built in the middle of a transfusion sequence.

Figure 8:
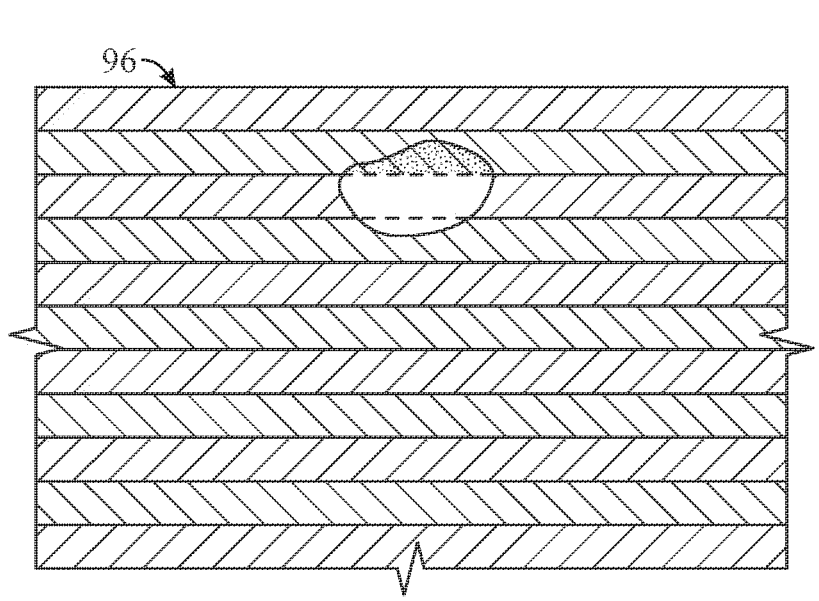
FIG. 8 is a schematic cross-sectional view of a 3D part built according to an example transfusion sequence that transfuses layers in a sequence of different transfusion control parameter profiles, in accordance with embodiments of the present disclosure.

FIG. 8 is a schematic cross-sectional view of a 3D part 126 built according to an example transfusion sequence 129 that builds a plurality of layers 22 in a sequence of different transfusion control parameter profiles. A first control parameter profile P1 includes a first combination of temperature and pressure (or force) parameters usable to transfuse a single layer 22 of the 3D part 126, and a second control parameter profile P2 includes a second combination of temperature and pressure parameters usable to transfuse a single layer 22 of the 3D part 126. The control parameter profiles P1 and P2 each specify controllable settings for the operation of the system 10. The temperature parameters for each profile P1 and P2 can include pre-transfusion image heater temperature (e.g., for heater 72 and/or 74), heatable transfusing nip element temperature (e.g., for nip roller 70), accumulated part layer heater temperature (e.g., for heater 90), accumulated part layer heater angle of incidence (e.g., providing selective heating of certain portions of the accumulated part layers based on heater orientation), post-nip cooling air flow rate (e.g., from jets 78). In some embodiments, a range of heating transfusing nip element temperature can be approximately 60 to 180° C., or approximately 110 to 140° C., with an outer surface of the nip element having a higher transient temperature (e.g., approximately 160 to 280° C.) that then cools by conduction with an interior of the nip element. The pressure or force parameters for each control parameter profile P1 and P2 can include heatable transfusing nip element pressure (e.g., for nip roller 70 as applied at the build surface 96). The second combination of temperature and pressure parameters of the second control parameter profile P2 is different from the first combination of temperature and pressure parameters of the first control parameter profile P1, though the difference can be just a single different temperature of pressure parameter or a different of many temperature and/or pressure parameters. Additionally, each control parameter profile P1 and P2 can include control parameters specifying layer thickness, layer material(s), and/or other characteristics, though in some embodiments layer thickness can be essentially constant for all control parameter profiles P1 and P2. For example, layer thicknesses can be varied in a range of 5 to 22 μm in some embodiments, or 10 to 18 μm in still other embodiments. With respect to layer material(s), the control parameter profile P1 or P2 can constrain one or more layers to just one material or can exclude that material.

The transfusion sequence 129 specifies an ordered sequence of using the control parameter profiles P1 and P2 to build the layers 22 of the 3D part 126. As shown schematically in the example embodiment of FIG. 8, n layers 22 are built according to the first control parameter profile P1, followed by m layers 22 built according to the second control parameter profile P2, followed by a repeating sequence of n+m layers according to the respective first and second control parameter profiles P1 and P2. The values of n and m are each positive integers. In some embodiments n=m, though in other embodiments n and m can be different. In some embodiments either or both n and/or m can be greater than one, such as in an example embodiment in which the second control parameter profile P2 transfuses layers relatively cold and m>1 such that multiple layers 22 of the 3D part 126 are built relatively cold in direct sequence to provide a relatively good chance for small build defects such as voids to be bridged or shelved before n>1 layers are built relatively hot according to the first control parameter profile P1 with relatively intense heat and post-transfusion cooling air flow. In some example transfusion sequences, a point of the pattern is to periodically introduce a layer 22 that has been sintered into a contiguous film prior to transfusion, which can bridge or shelve over defects in previously accumulated part layers, and thereby increase the chances that the resultant part will complete successfully. The sintering can be achieved done by heating the layer 22 up a lot before transfusing. Single-layer bridge layers may be fragile, so post-transfusion cooling air rate should be decreased to not blow them away; though in many situations it is better to transfer part and support materials in more of a powder form, so that solvents and trapped gas can better get out of the newly fused layer (and avoid blistering). As another example, the first control parameter profile P1 includes a relatively high heatable transfusing nip element pressure or force, and the second control parameter profile P2 includes a relatively low heatable transfusing nip element pressure or force, which allows all accumulated layers of the 3D part 126 to experience relatively high pressure when within the thermal diffusion depth $D_{TD}$ while reducing a total impulse average on the build surface 96 over time.

The following tables provide example embodiments of control parameter profiles and associated transfusion sequences. These example tables are disclosed merely by way of example. Numerous other profiles and sequences are possible.

TABLE 1

| No. of Layers | Pre-transfusion Heater Temp. | Heatable Transfusing Nip Element Temp. | Accumulated Part Heater Temp. | Post-nip Cooling Air Flow Rate | Heatable Transfusing Nip Element Pressure | Layer Thickness |
|---|---|---|---|---|---|---|
| n ≥ 1 | High | High | High | High | Moderate | Constant |
| m > 1 | Low | Low | Low | Moderate | Moderate | Constant |

TABLE 2

| No. of Layers | Pre-transfusion Heater Temp. | Heatable Transfusing Nip Element Temp. | Accumulated Part Heater Temp. | Post-nip Cooling Air Flow Rate | Heatable Transfusing Nip Element Pressure | Layer Thickness |
|---|---|---|---|---|---|---|
| n ≥ 1 | Moderate | Moderate | Moderate | Moderate | High | Constant |
| m > 1 | Moderate | Moderate | Moderate | Moderate | Low | Constant |

TABLE 3

| No. of Layers | Pre-transfusion Heater Temp. | Heatable Transfusing Nip Element Temp. | Accumulated Part Heater Temp. | Post-nip Cooling Air Flow Rate | Heatable Transfusing Nip Element Pressure | Layer Thickness |
|---|---|---|---|---|---|---|
| n ≥ 1 | High | High | High | High | Moderate | Thin |
| m ≥ 1 | Low | Low | Low | Low to Moderate | Moderate | Thin |
| q = 1 | Moderate | Moderate | Moderate | Moderate | High | Thick |

TABLE 4

| No. of Layers | Target Pre-Transfusion Layer Temp. | Target Nip Temp. | Post-nip Cooling Air Flow Rate |
|---|---|---|---|
| n = 5 | 130° C. | 210° C. | 60% |
| m = 1 | 180° C. | 190° C. | 30% |

Figure 9:
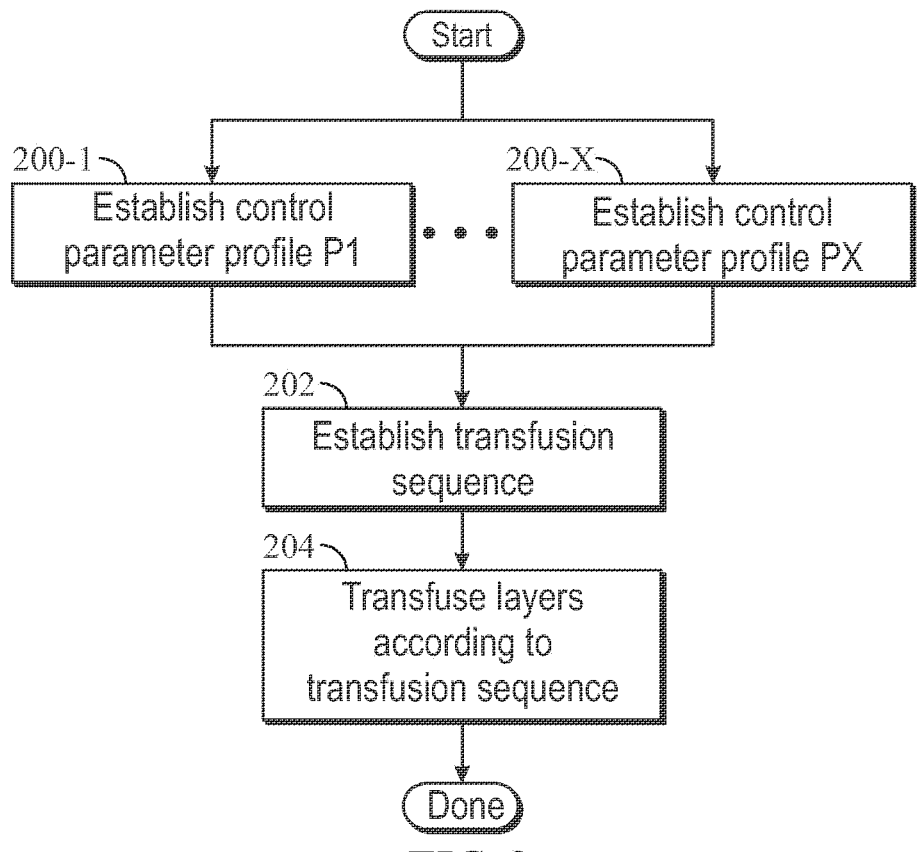
FIG. 9 is a flow chart of an example method of building a 3D part and associated support structures in a layerwise manner according to a transfusion sequence, in accordance with embodiments of the present disclosure.

FIG. 9 is a flow chart of a method of building a 3D part 26 or 126 (and associated support structures) in a layerwise manner according to a transfusion sequence. According to the illustrated method, x different control parameter profiles P1 to Px are established, where x is an integer greater than or equal to two (steps 200-1 to 200-x). Then a transfusion sequence is established utilizing at least two of the control parameter profiles P1 to Px. Then build events are performed by an electrophotography-based additive manufacturing system 10 to transfuse a plurality of layers 22 according to the transfusion sequence (step 204).

FIGS. 10A to 10D are flow charts of example methods of transfusing layers 22 according to a transfusion sequence. Either of the illustrated methods of FIG. 10A or 10B can be used in conjunction with the method illustrated in FIG. 9, for example. It should be noted that still further embodiments of layer transfusions according to a transfusion sequence are also contemplated, such as layer transfusions according to further embodiments of transfusion sequences (for example, with more than three different control parameter profiles and/or with more complex sequencing of the control parameter profiles).

Figure 10A:
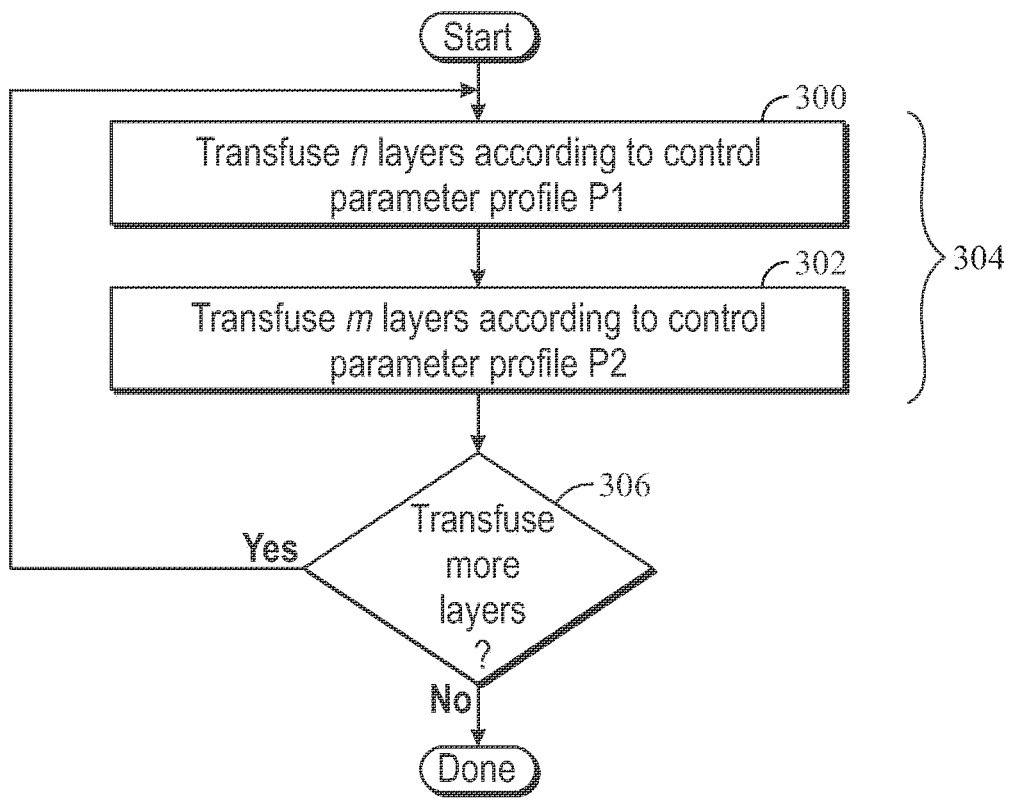
FIGS. 10A, 10B, 10C and 10D are flow charts of example methods of transfusing layers according to a transfusion sequence, in accordance with embodiments of the present disclosure.

In the method illustrated in FIG. 10A, n layers 22 are transfused on a bonding region or build surface 96 of previously accumulated layers of a 3D part 26 or 126 according to a first control parameter profile P1, where n is a positive integer (step 300). If n>1, the n layers 22 can be transfused according to the first control parameter profile P1 in a consecutive manner at step 300, such that no other control parameter profiles are used to transfuse layers in between any of the n layers 22. Next, m layers 22 are transfused on a bonding region or build surface 96 of previously accumulated layers of a 3D part 26 or 126 according to a second control parameter profile P2, different from the profile P1, where m is a positive integer (step 302). If m>1, the m layers 22 can be transfused according to the second control parameter profile P2 in a consecutive manner at step 302, such that no other control parameter profiles are used to transfuse layers in between any of the m layers 22. Thermal energy is added to the previously accumulated layers of the 3D part 26 or 126 from the build surface 96 to a thermal diffusion depth $D_{TD}$ within the previously accumulated layers with the transfusion of each layer 22 in steps 300 and 302. Together, steps 300 and 302 involve transfusing n+m layers on previously accumulated layers of the 3D part 26 or 126 according to a transfusion sequence 304. A combined thickness of the n+m layers 22 can be less than the thermal diffusion depth $D_{TD}$. For example, in some embodiments the total thickness of the n+m layers can satisfy the relationship $\Gamma*(n+m)*2 < D_{TD}$, where $\Gamma$ is layer thickness.

When the transfusion sequence 304 is complete, a query is made to assess whether any further layers are desired to be transfused (step 306). If there are further layer transfusions desired, the method can return to step 300 and the transfusion sequence 304 can be repeated. In alternate embodiments, a different transfusion sequence (not shown in FIG. 10A) can be used after step 306 to transfuse additional layers 22. If no further layer transfusions are desired, the method can conclude.

Figure 10B:
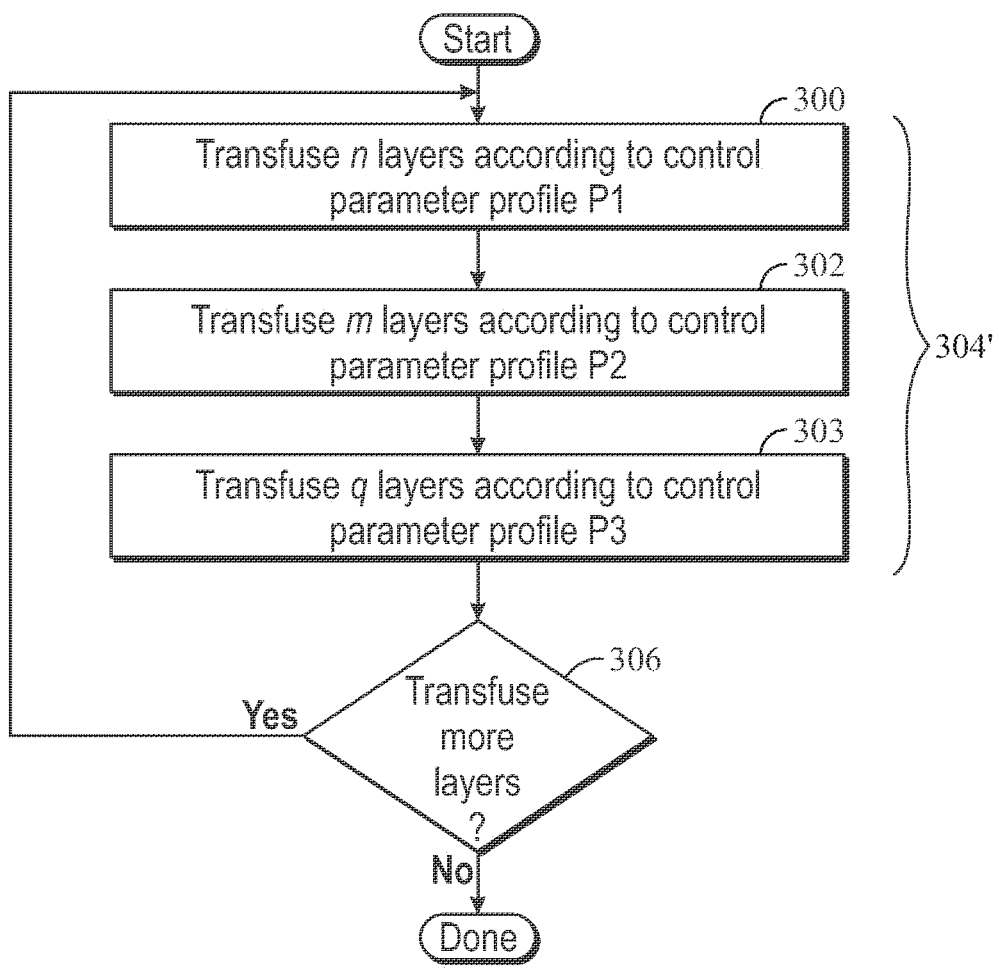

In the method illustrated in FIG. 10B, n layers 22 are transfused on a bonding region or build surface 96 of previously accumulated layers of a 3D part 26 or 126 according to a first control parameter profile P1, where n is a positive integer (step 300). If n>1, the n layers 22 can be transfused according to the first control parameter profile P1 in a consecutive manner at step 300, such that no other control parameter profiles are used to transfuse layers in between any of the n layers 22. Next, m layers 22 are transfused on a bonding region or build surface 96 of previously accumulated layers of a 3D part 26 or 126 according to a second control parameter profile P2, different from the profile P1, where m is a positive integer (step 302). If m>1, the m layers 22 can be transfused according to the second control parameter profile P2 in a consecutive manner at step 302, such that no other control parameter profiles are used to transfuse layers in between any of the m layers 22. Next, q layers 22 are transfused on a bonding region or build surface 96 of previously accumulated layers of a 3D part 26 or 126 according to a third control parameter profile P3, different from both the profiles P1 and P2, where q is a positive integer (step 303). If q>1, the q layers 22 can be transfused according to the third control parameter profile P3 in a consecutive manner at step 302, such that no other control parameter profiles are used to transfuse layers in between any of the q layers 22. Thermal energy is added to the previously accumulated layers of the 3D part 26 or 126 from the build surface 96 to a thermal diffusion depth $D_{TD}$ within the previously accumulated layers with the transfusion of each layer 22 in steps 300, 302, and 303. Together, steps 300, 302, and 303 involve transfusing n+m+q layers on previously accumulated layers of the 3D part 26 or 126 according to a transfusion sequence 304'. A combined thickness of the n+m+q layers 22 can be less than the thermal diffusion depth $D_{TD}$.

When the transfusion sequence 304' is complete, a query is made to assess whether any further layers are desired to be transfused (step 306). If there are further layer transfusions desired, the method can return to step 300 and the transfusion sequence 304' can be repeated. In alternate embodiments, a different transfusion sequence (for example, the transfusion sequence 304 shown in FIG. 10A) can be used after step 306 to transfuse additional layers 22 following the transfusion sequence 304'. If no further layer transfusions are desired, the method can conclude.

Figure 10C:
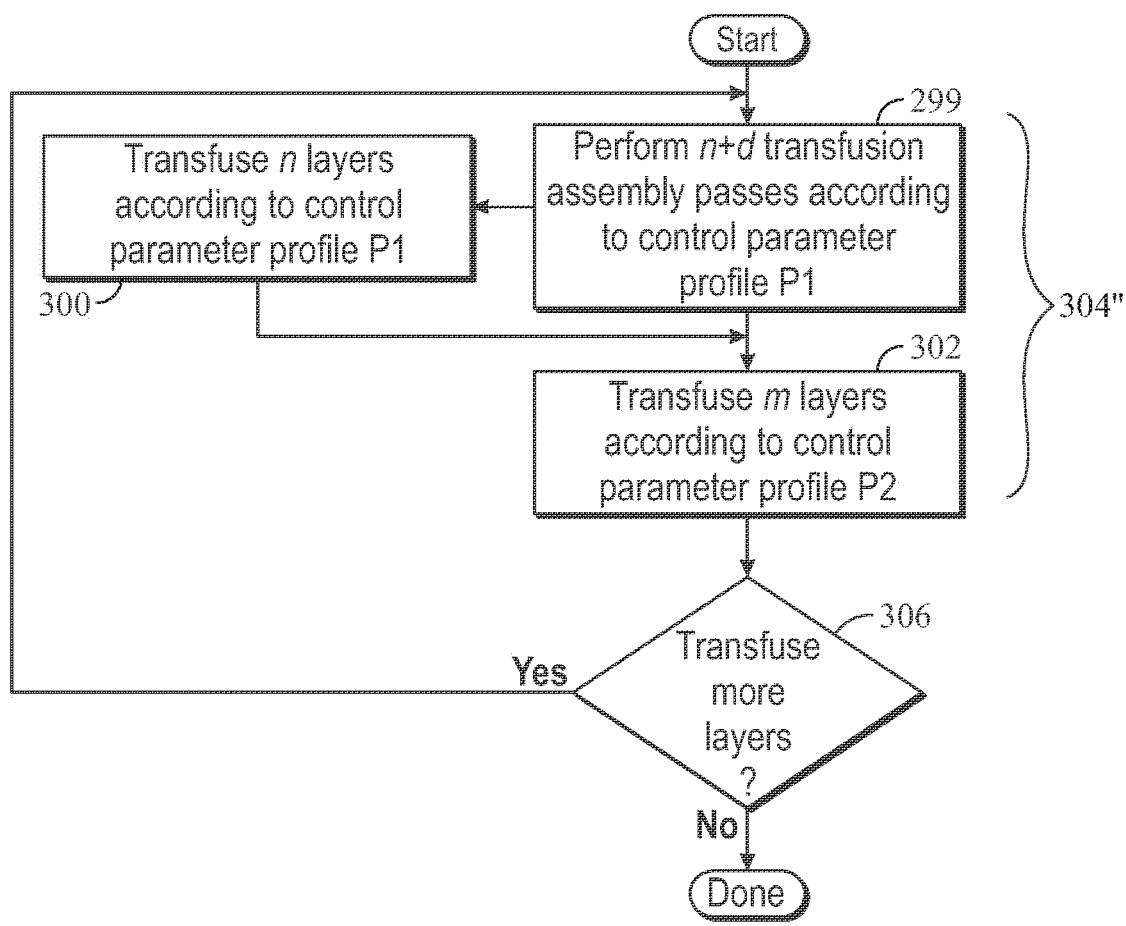

In the method illustrated in FIG. 10C, n+d transfusion assembly passes are made according to a first control parameter profile P1, where n and d are each a positive integer (step 299). As part of the n+d transfusion passes, n layers 22 are transfused on a bonding region or build surface 96 of previously accumulated layers of a 3D part 26 or 126 according to the first control parameter profile P1 (step 300). As part of steps 299 and 300, d transfusion assembly passes occur without a new layer 22 being transfusion on the bonding region or build surface 96. Non-transfusing passes of the transfusion assembly 20 can involve most or all of the temperature and pressure steps performed during a typical transfusion event but no new layer is transfused, making these non-transfusion passes akin to dummy passes that do not add to the previously accumulated layers of the part 26 or 126 but can allow the system 10 time to adjust one or more transfusion parameters before transfusing the next layer 22, to help consolidate porous materials, generate relatively glossy top surfaces on the part 26 or 126, etc. If n>1, the n layers 22 can be transfused according to the first control parameter profile P1 in a consecutive manner at step 300, such that no other control parameter profiles are used to transfuse layers in between any of the n layers 22. The d non-transfusing transfusion assembly passes can occur after transfusion of the n layers, in some embodiments. Next, m layers 22 are transfused on a bonding region or build surface 96 of previously accumulated layers of a 3D part 26 or 126 according to a second control parameter profile P2, different from the profile P1, where m is a positive integer (step 302). If m>1, the m layers 22 can be transfused according to the second control parameter profile P2 in a consecutive manner at step 302, such that no other control parameter profiles are used to transfuse layers in between any of the m layers 22. Thermal energy is added to the previously accumulated layers of the 3D part 26 or 126 from the build surface 96 to a thermal diffusion depth $D_{TD}$ within the previously accumulated layers with the transfusion of each layer 22 in steps 300 and 302. Together, steps 300 and 302 involve transfusing n+m layers on previously accumulated layers of the 3D part 26 or 126 according to a transfusion sequence 304". A combined thickness of the n+m layers 22 can be less than the thermal diffusion depth $D_{TD}$.

When the transfusion sequence 304" is complete, a query is made to assess whether any further layers are desired to be transfused (step 306). If there are further layer transfusions desired, the method can return to step 299 and the transfusion sequence 304" can be repeated. In alternate embodiments, a different transfusion sequence (for example, the transfusion sequence 304' shown in FIG. 10B) can be used after step 306 to transfuse additional layers 22 following the transfusion sequence 304". If no further layer transfusions are desired, the method can conclude.

It generally takes more than one layer cycle time to switch between control parameter profiles. For example, the system 10 may ramp a transfuse nip element force at about 45 newtons (101*bf*) per layer. The temperature in the top 1-2 mm of the accumulated layers of the part 26 or 126 at or near the bonding region 96 may take 10-100 transfusion passes (or layer transfusions) to stabilize. If a slower-changing parameter is varying as part of the transfusion sequence, then a transitional state can be provided with (dummy) non-transfusion passes to allow the process parameter of the system 10 to catch up with a target parameter. Therefore, mode-switching can be used, to spend a layer time or more going-through-the-motions of a transfusion event or transfusion pass, but not actually transferring any layer from the transfer medium 24 to the bonding region 96. More specifically, this can allow the transfusion assembly 20 passes that actually transfuse layers 22 to be performed at relatively low bulk temperature and relatively high transfer pressure, and then have transfusion assembly passes where the part build surface is only lightly pressed, no image is transferred, and the average temperature of the top 1-2 mm of the accumulated part layers is high. This helps make a part that is both accurate and strong, with a trade-off of some reduction in throughput of the system 10.

Figure 10D:
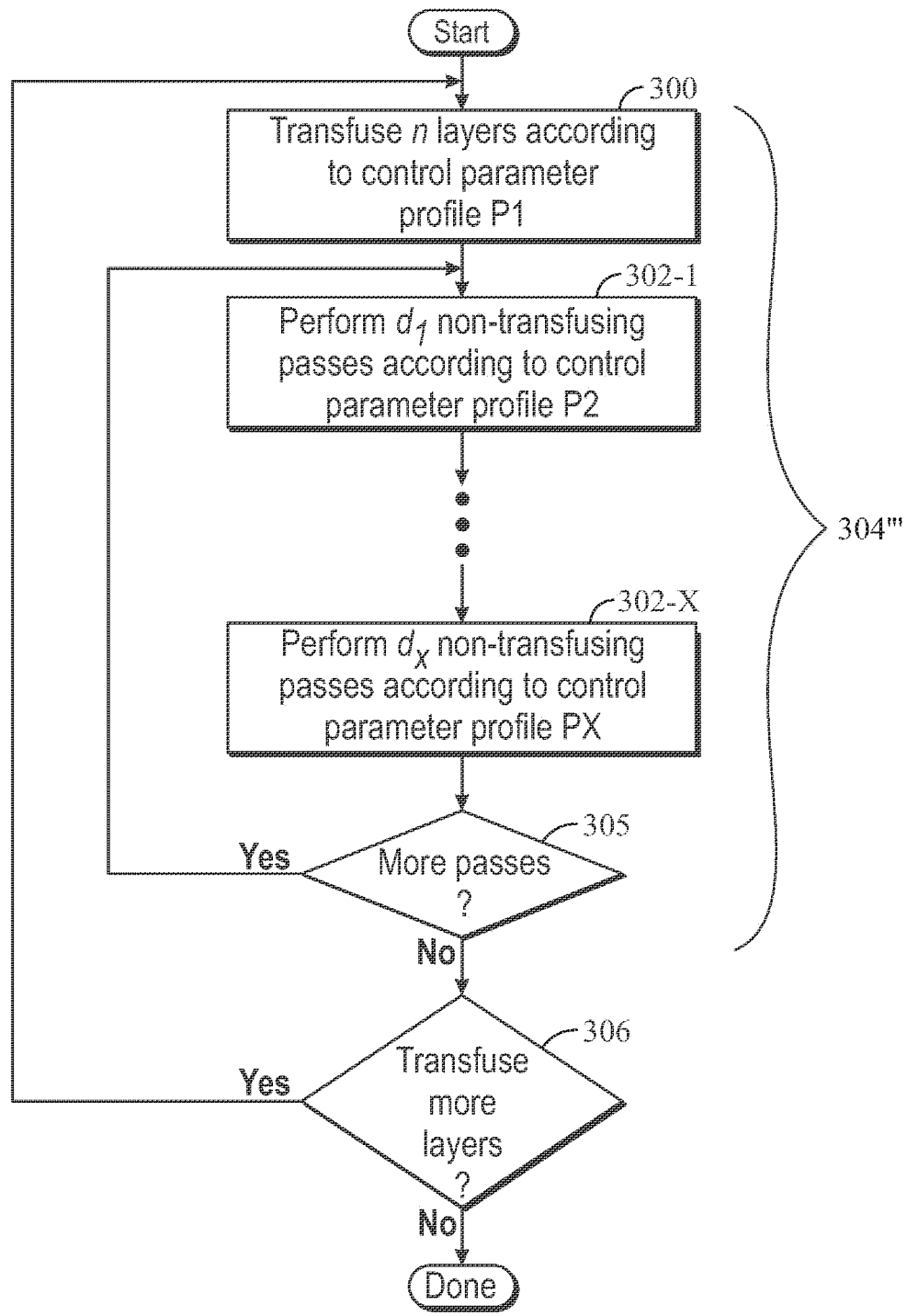

In the method illustrated in FIG. 10D, n layers 22 are transfused on a bonding region or build surface 96 of previously accumulated layers of a 3D part 26 or 126 according to the first control parameter profile P1, where n is a positive integer (step 300). If n>1, the n layers 22 can be transfused according to the first control parameter profile P1 in a consecutive manner at step 300, such that no other control parameter profiles are used to transfuse layers in between any of the n layers 22. Next, $d_1$ non-transfusing passes of the transfusion assembly 20 are performed according to a second control parameter profile P2, different from the profile P1, where $d_1$ is a positive integer (step 302-1), followed by x additional non-transfusing passes $d_x$ of the transfusion assembly 20 performed according to respective control parameter profiles Px. Thermal energy is added to the previously accumulated layers of the 3D part 26 or 126 from the build surface 96 to a thermal diffusion depth $D_{TD}$ within the previously accumulated layers with the transfusion of each layer 22 in steps 300 and 302-1 to 302-x. Then a decision is made as to whether any additional non-transfusing passes are desired (step 305), and if so the method can return to step 302-1. the Together, steps 300, 302-1 to 302-x and any repetitions pursuant to step 305 involve transfusing n layers on previously accumulated layers of the 3D part 26 or 126 according to a transfusion sequence 304'''. A combined thickness of then layers 22 can be less than the thermal diffusion depth Dm.

When the transfusion sequence 304''' is complete, a query is made to assess whether any further layers are desired to be transfused (step 306). If there are further layer transfusions desired, the method can return to step 300 and the transfusion sequence 304''' can be repeated. In alternate embodiments, a different transfusion sequence (for example, the transfusion sequence 304' shown in FIG. 10B) can be used after step 306 to transfuse additional layers 22 following the transfusion sequence 304'''. If no further layer transfusions are desired, the method can conclude.

Table 5 provide an additional example embodiment of control parameter profiles and associated transfusion sequences. This example table is disclosed merely by way of example. Numerous other profiles and sequences are possible. In one embodiment according to Table 5, n=d, and n can be six.

TABLE 5

| No. of Passes | Layer(s) Transfused?. | Target Ave. Temp. of Top 1-2 mm of Accumulated Part | Target Nip Temp. | Heatable Transfusing Nip Element Force |
|---|---|---|---|---|
| n | Yes | 115° C. | 210° C. | 356 newtons |
| d | No | 115° C. | 210° C. | 67 newtons |
| d | No | 150° C. | 250° C. | 67 newtons |
| d | No | 115° C. | 180° C. | 67 newtons |
| d | No | 115° C. | 210° C. | 356 newtons |

The methods discussed above can be implemented on software and/or firmware, and executed with the system 10 via one or more processors, in some embodiments.

Although the present disclosure has been described with reference to preferred embodiments, workers skilled in the art will recognize that changes may be made in form and detail without departing from the spirit and scope of the disclosure.

The invention claimed is:

1. A method for making a three-dimensional (3D) part in a layerwise manner with an electrostatographic based additive manufacturing system, the method comprising:
   establishing a first control parameter profile, wherein the first control parameter profile includes a first combination of temperature and pressure parameters usable to transfuse a single layer of the 3D part;
   establishing a second control parameter profile, wherein the second control parameter profile includes a second combination of temperature and pressure parameters usable to transfuse a single layer of the 3D part, and wherein the second combination of temperature and pressure parameters is different from the first combination of temperature and pressure parameters;

establishing a transfusion sequence usable to transfuse a plurality of layers, wherein the transfusion sequence specifies the use of each of the first control parameter profile and the second control parameter profile in a specified order; and transfusing n+m layers on a bonding region of previously accumulated layers of the 3D part according to the transfusion sequence, where n and m are each a positive integer, wherein thermal energy is added to the previously accumulated layers from the bonding region to a thermal diffusion depth within the previously accumulated layers with transfusion of each layer, and wherein a total thickness of the n+m layers is less than the thermal diffusion depth, the transfusion step comprising:

transfusing n layers on the bonding region of previously accumulated layers of the 3D part according to the first control parameter profile; and after transfusing the n layers, transfusing m layers on the bonding region of previously accumulated layers of the 3D part according to the second control parameter profile; and cycling through the transfusion sequence until all the layers of the 3D part have been transfused.

2. The method of claim 1, wherein the first combination of temperature and pressure parameters of the first control parameter profile comprises electrostatographic based additive manufacturing system settings for pre-transfusion layer heater temperature, heatable transfusing nip element temperature, accumulated part layer heater temperature, angle of incidence of accumulated part layers heat, post-nip cooling air flow rate, and heatable transfusing nip element pressure, and wherein the second combination of temperature and pressure parameters of the second control parameter profile comprises electrostatographic based additive manufacturing system settings for pre-transfusion layer heater temperature, heatable transfusing nip element temperature, accumulated part layer heater temperature, post-nip cooling air flow rate, and heatable transfusing nip element pressure.

3. The method of claim 1, wherein first control parameter profile includes a relatively high heatable transfusing nip element temperature and a relatively high post-nip cooling air flow rate, and wherein the second control parameter profile includes a moderate heatable transfusing nip element temperature and a relatively low post-nip cooling air flow rate.

4. The method of claim 1, wherein m>1.

5. The method of claim 1, wherein at least one n layer includes a void produced by a layer building error, and wherein at least one m layer forms a bridge or shelf over at least part of the void.

6. The method of claim 1, wherein the first control parameter profile includes a relatively high heatable transfusing nip element pressure, and wherein the second control parameter profile includes a relatively low heatable transfusing nip element pressure.

7. The method of claim 1, wherein the thermal diffusion depth is approximately 125 µm to approximately 750 µm.

8. The method of claim 1 any of, wherein the thermal diffusion depth is approximately the thickness of twenty-four accumulated layers of the 3D part.

9. The method of claim 1, and further comprising:
performing at least one transfusion pass without transfusing a new layer onto the bonding region.

10. The method of claim 1, and further comprising transfusing another n+m layers on the bonding region of previously accumulated layers of the 3D part according to the transfusion sequence.

11. The method of claim 1, wherein the first control parameter profile is configured to build layers with relatively high performance in a first category and lower performance in a second category, and wherein the second control parameter profile is configured to build layers with relatively high performance in the second category and lower performance in the first category.

12. The method of claim 1, wherein the first category comprises 3D part fracture strength, and wherein the second category comprises quality of bridge or shelf formation.

13. A method for making a three-dimensional (3D) part in a layerwise manner with an electrostatographic based additive manufacturing system, the method comprising:

establishing a first control parameter profile, wherein the first control parameter profile includes a first combination of temperature and force parameters usable to control the electrostatographic based additive manufacturing system to build a single layer of the 3D part, and wherein the first control parameter profile is configured to build layers with relatively high performance in a first category and lower performance in a second category;

establishing a second control parameter profile, wherein the second control parameter profile includes a second combination of temperature and force parameters usable to control the electrostatographic based additive manufacturing system to build a single layer of the 3D part, wherein the second control parameter profile is configured to build layers with relatively high performance in the second category and lower performance in the first category, and wherein the second combination of temperature and force parameters is different from the first combination of temperature and force parameters;

establishing a transfusion sequence usable to transfuse a plurality of layers, wherein the transfusion sequence specifies the use of each of the first control parameter profile and the second control parameter profile in a specified order, the transfusion sequence comprising instructions to transfuse n layers on the bonding region of previously accumulated layers of the 3D part according to the first control parameter profile and to transfuse m layers on the bonding region of previously accumulated layers of the 3D part according to the second control parameter profile after transfusion of the n layers;

transfusing n+m layers on a bonding region of previously accumulated layers of the 3D part according to the transfusion sequence, where n and m are each a positive integer, wherein thermal energy is added to the previously accumulated layers from the bonding region to a thermal diffusion depth within the previously accumulated layers with transfusion of each layer, and wherein a total thickness of the n+m layers is less than the thermal diffusion depth; and transfusing another n+m layers on the bonding region of previously accumulated layers of the 3D part according to the transfusion sequence; and cycling through the transfusion sequence until all the layers of the 3D part have been transfused.

14. The method of claim 13, wherein first control parameter profile includes a relatively high heatable transfusing nip element temperature and a relatively high post-nip cooling air flow rate, and wherein the second control parameter profile includes a moderate heatable transfusing nip element temperature and a relatively low post-nip cooling air flow rate.

15. The method of claim 13, wherein at least one n layer includes a void produced by a layer building error, and wherein at least one m layer forms a bridge or shelf over at least part of the void.

16. The method of claim 13, wherein first control parameter profile includes a relatively high heatable transfusing nip element force, and wherein the second control parameter profile includes a relatively low heatable transfusing nip element force.

17. The method of claim 13, and further comprising:
performing at least one transfusion pass without transfusing a new layer onto the bonding region.

18. The method of claim 13, wherein the first category comprises 3D part fracture strength, and wherein the second category comprises quality of bridge or shelf formation.

19. The method of claim 13, and further comprising:
developing a powder material using at least one electrostatographic engine to provide a first one of the n+m layers;
supporting the first one of the n+m layers on a transfer medium;
conveying the first one of the n+m layers to a transfusion assembly via the transfer medium;
heating the first one of the n+m layers prior to application of a transfusing force by a transfusing nip element; and
cooling the first one of the n+m layers and the previously accumulated layers of the 3D part after application of the transfusing force by the transfusing nip element.

20. A method for making a three-dimensional (3D) part in a layerwise manner with an electrostatographic based additive manufacturing system, the method comprising:
establishing a first control parameter profile, wherein the first control parameter profile includes a first combination of parameters usable to transfuse a single layer of the 3D part;
establishing a second control parameter profile, wherein the second control parameter profile includes a second combination of parameters, and wherein the second combination of parameters is different from the first combination of parameters;
establishing a transfusion sequence usable to perform transfusion assembly passes with a transfusion assembly of the electrostatographic based additive manufacturing system involving n+d transfusion assembly passes, where n and d are each a positive integer, wherein the transfusion sequence specifies the use of each of the first control parameter profile and the second control parameter profile in a specified order to transfuse a plurality of layers;
transfusing n layers on a bonding region of previously accumulated layers of the 3D part according to the transfusion sequence, wherein the n layers are transfused on the bonding region of previously accumulated layers of the 3D part according to the first control parameter profile; and
performing d non-transfusing passes with the transfusion assembly according to the transfusion sequence, wherein the d non-transfusing passes do not transfuse any new layers on the bonding region, and wherein at least one of the d non-transfusing passes is performed using the second control parameter profile; and
cycling through the transfusion sequence until all the layers of the 3D part have been transfused.

* * * * *